United States Patent
Klein

Patent Number: 5,895,203
Date of Patent: Apr. 20, 1999

[54] CENTRIFUGAL PUMP HAVING SEPARABLE, MULTIPARTITE IMPELLER ASSEMBLY

[75] Inventor: Manfred P. Klein, Highland Park, Ill.

[73] Assignee: Ansimag Incorporated, Elk Grove Village, Ill.

[*] Notice: This patent is subject to a terminal disclaimer.

[21] Appl. No.: 08/633,870

[22] Filed: Apr. 15, 1996

[51] Int. Cl.⁶ .................. F04D 29/20; F04B 17/00
[52] U.S. Cl. .............. 415/122.1; 415/142; 415/200; 416/244 R; 417/360; 417/420
[58] Field of Search .............. 416/204 R, 244 R, 416/3; 417/360, 420; 29/453, 889.2; 403/327, 329, 383, DIG. 7; 285/319, 921; 464/179, 182, 183, 185; 415/122.1, 170.1, 142, 172.1, 200, 206, 229, 209.2–209.4, 210.1, 189–191, 193, 208.2, 216.1

[56] References Cited

U.S. PATENT DOCUMENTS

| | | | |
|---|---|---|---|
| 2,709,569 | 5/1955 | Roush | 415/216.1 |
| 2,906,208 | 9/1959 | White | 416/221 |
| 3,743,437 | 7/1973 | Warren . | |
| 3,784,235 | 1/1974 | Kessler et al. | 285/921 |
| 3,837,690 | 9/1974 | Fraser, Jr. et al. | 285/319 |
| 3,912,009 | 10/1975 | Davis, Jr. | 285/319 |
| 3,927,703 | 12/1975 | Beaubien | 285/921 |
| 4,004,541 | 1/1977 | Onal . | |
| 4,169,793 | 10/1979 | Lockshaw | 285/319 |
| 4,248,571 | 2/1981 | Sieghartner . | |
| 4,275,907 | 6/1981 | Hunt | 285/319 |
| 4,479,756 | 10/1984 | Sighartner . | |
| 4,486,034 | 12/1984 | Sauer | 285/319 |
| 4,779,902 | 10/1988 | Lee | 285/921 |
| 4,793,771 | 12/1988 | Laing . | |
| 4,820,117 | 4/1989 | Larrabee et al. | 415/142 |
| 4,832,573 | 5/1989 | Dorski . | |
| 4,850,818 | 7/1989 | Kotera . | |
| 4,946,347 | 8/1990 | Otto | 415/200 |
| 5,176,406 | 1/1993 | Straghan | 285/319 |
| 5,228,830 | 7/1993 | Pastore | 415/200 |
| 5,277,500 | 1/1994 | Keck . | |
| 5,306,117 | 4/1994 | Bear et al. | 415/142 |

FOREIGN PATENT DOCUMENTS 5-10245  1/1993  Japan .

Primary Examiner—Christopher Verdier
Attorney, Agent, or Firm—Darin E. Bartholomew

[57] ABSTRACT

The centrifugal pump includes a separable, multipartite impeller assembly and preferably incorporates a shock-absorbent shaft support that is tolerant of impeller vibrations or minor imbalances in the impeller assembly. The multipartite impeller assembly comprises an impeller portion, a wet-end magnetic coupler, and a radial bearing. The impeller portion and the wet-end magnetic coupler are secured together by a snap-fit joint, which is reinforced by a radial bearing adjacent to the snap-fit joint. The shaft support has an encapsulation junction which secures braces to a peripheral base.

49 Claims, 18 Drawing Sheets

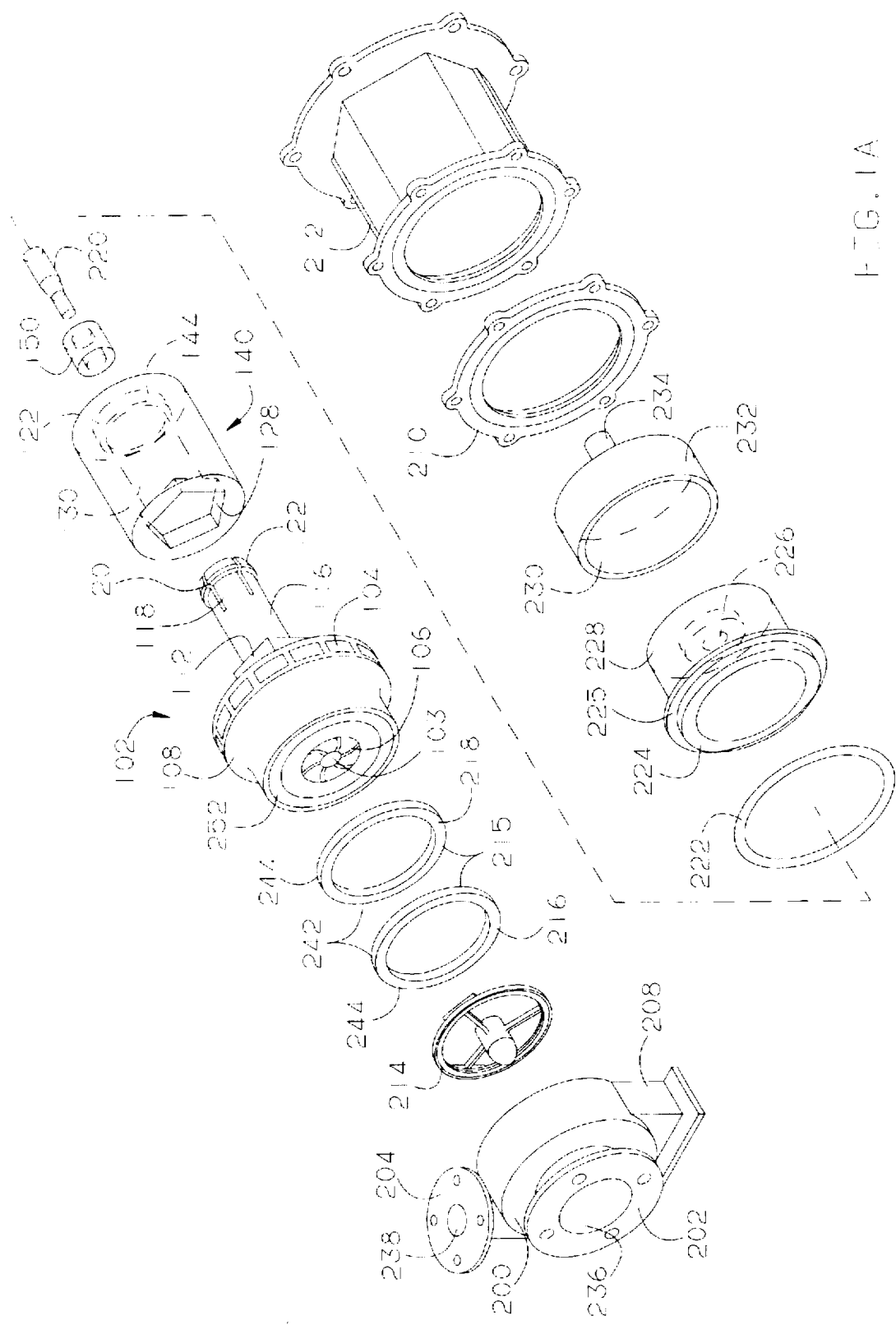

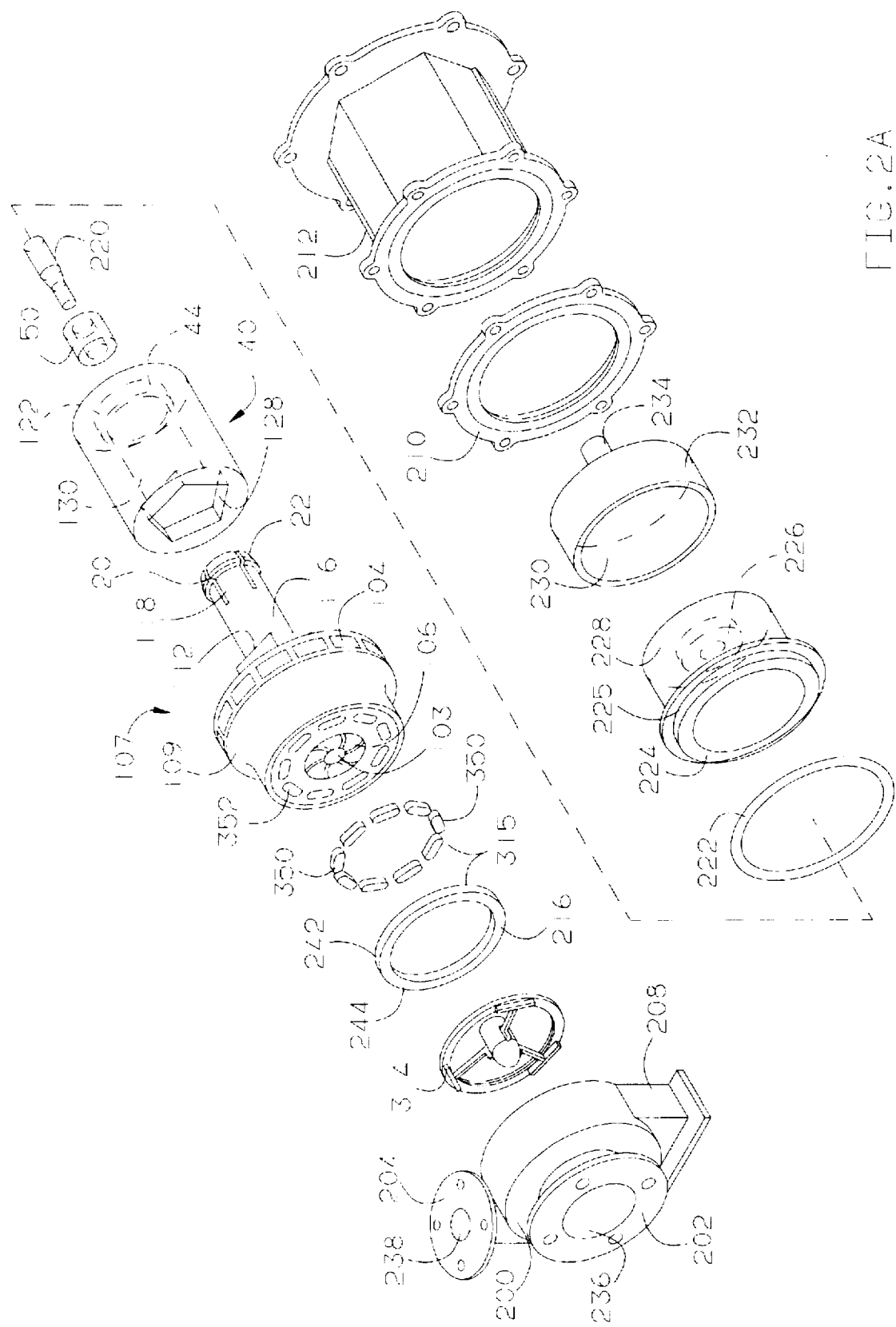

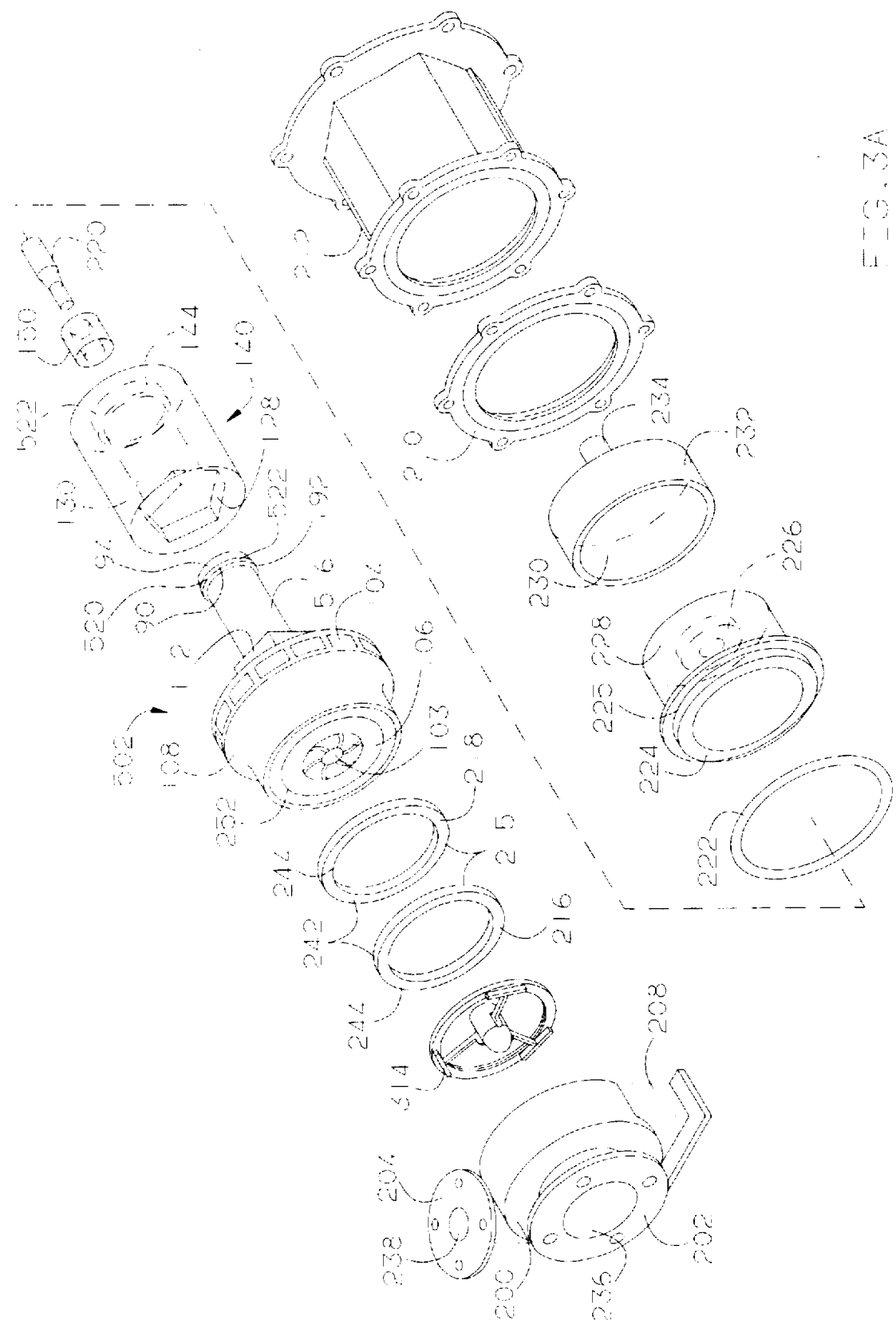

CENTRIFUGAL PUMP HAVING SEPARABLE, MULTIPARTITE IMPELLER ASSEMBLY

FIELD OF INVENTION

The present invention is generally directed toward centrifugal pumps; and more particularly toward magnetic-drive centrifugal pumps having separable, multipartite impeller assemblies and shock-absorbent shaft supports.

BACKGROUND ART

In magnetic-drive pumps, a wet-end magnetic coupler is often permanently attached to the impeller. For example, the wet-end magnetic coupler may be permanently coupled to the impeller by molding the impeller and wet-end magnetic coupler together. The wet-end magnetic coupler is attached to the impeller at the impeller's rear, creating an indivisible impeller-magnetic coupler unit. If the impeller is damaged or if an impeller with a different size is required, the entire unit must be replaced.

Some pump manufacturers have removably coupled the wet-end magnetic coupler to the impeller's rear. However, removable connections between the impeller and wet-end magnetic coupler often lack stability. The background art has connected the impeller to the wet-end magnetic coupler by threaded connections, twist-on connections, and spline connections. The threaded connection and twist-on connection may loosen during occasional reverse rotation of the impeller causing the partial or complete disengagement of the magnetic coupler and the impeller. Spline connections may loosen in response to axial forces placed upon the impeller; especially where wear rings are worn. Damage to pumps can result from the failure of the background art connections. Therefore, a need exists for an impeller assembly which stays together during normal pump operation, but allows for separation of the impeller and wet-end magnetic coupler during pump maintenance.

Centrifugal pumps may have stationary shafts or rotating shafts. In pumps with stationary shafts, the shaft is stationary with respect to the pump housing and the impeller rotates about the shaft. In pumps with rotating shafts, the shaft rotates simultaneously with the impeller. All centrifugal pumps, regardless of whether or not the shaft is stationary, require shaft supports that maintain the correct orientation of the shaft with respect to the housing and bearings.

When centrifugal pumps operate, hydraulic forces are transmitted from the impeller to the shaft. The hydraulic forces have both radial and axial components. The shaft support must have the necessary mechanical strength to prevent the shaft from being misaligned. Shaft misalignment can cause deterioration of wear rings and bearings of centrifugal pumps. Even the temporary displacement of a shaft can cause impeller damage because of a reduced radial gap between the impeller and the volute. For example, the vanes of a displaced impeller or an impeller shroud may be fractured by the pressurized fluid flow.

Radial forces are often a result of operating the pump outside of a design flow range. The volute cross sectional area is only optimized for a limited capacity range called the design flow range. If the pump deviates from the design flow range, unbalanced radial forces act on the impeller. The prior art has reduced radial forces by using double-volute configurations and using diffraction vanes that radially surround the impeller. In general, radial loads increase with increasing impeller diameter and decreasing impeller speed.

Axial forces are partially caused by the pressure difference between the suction head and the pressure head. Dynamic axial forces occur because of eddy current flows around the impeller based on the geometric relationship between the impeller and the housing.

Radial and axial forces are often characterized by low frequency vibrations being transmitted throughout the pump. When the moving impeller blade passes a stationary volute, fluid turbulence causes additional vibrations in the pump. Vibrations in the centrifugal pump can cause loosening of fasteners, failure of thrust bearings, failure of radial bearings, and breakage of shafts. Therefore, a need exists for a shaft support which can tolerate radial forces and reduce vibrations.

SUMMARY OF THE PRESENT INVENTION

The centrifugal pump of the present invention includes a separable, multipartite impeller assembly. The centrifugal pump may incorporate a shock-absorbent shaft support that is tolerant of impeller vibrations or minor imbalances in the impeller assembly.

The multipartite impeller assembly comprises an impeller portion, a wet-end magnetic coupler, and a radial bearing. The impeller portion and the wet-end magnetic coupler have complementary shapes which can be interlocked. The impeller portion and the wet-end magnetic coupler are secured together by a snap-fit joint, which is reinforced by a radial bearing adjacent to the snap-fit joint. The adjacent radial bearing inhibits radial movement of the snap-fit connector that would otherwise tend to release the snap-fit connection. The wet-end magnetic coupler has a plurality of magnets or a torque ring for magnetic coupling between the wet-end magnetic coupler and a dry-end magnetic coupler. A motor drives the dry-end magnetic coupler which in turn imparts rotational motion to the wet-end magnetic coupler.

The impeller portion preferably has a polygonal extension and a tube protruding from a rear shroud of the impeller. The polygonal extension interlocks with a polygonal recess in the wet-end magnetic coupler, while the tube interlocks with a hollow region in the wet-end magnetic coupler. The tube optimally terminates in an annular snap-fit protrusion. The snap-fit protrusion interlocks with a snap-fit cavity in the wet-end magnetic coupler to join the impeller portion to the wet-end magnetic coupler. The radial bearing is placed within a tube interior, securing the impeller portion to the wet-end magnetic coupler.

A shaft support is located between the impeller and the pump inlet. The shaft support adjoins the housing and supports the pump shaft. The shaft support partially isolates the pump housing from shaft vibrations and impeller vibrations.

The shaft support features a hub, braces, and a peripheral base. The hub mates with a stationary or rotatable shaft of the centrifugal pump. The braces extend radially from the hub. The braces are streamlined to the fluid flow and provide structural rigidity to maintain proper alignment of the pump shaft within the pump. The braces radially extend outward toward the peripheral base, which is constructed from a plastic, a polymer, or a resilient material. Thrust bearings, radial bearings, and various mounting fasteners are subjected to reduced vibrations from the isolation provided by the shaft support. Consequently, the shock-absorbent shaft support promotes longevity and reliability of the centrifugal pump.

In a preferred embodiment, the shaft support is reinforced by a metal framework. The framework includes interior brace reinforcements and interior peripheral reinforcement members. The braces have interior brace reinforcements which are encapsulated by a corrosion-resistant exterior layer. An interior peripheral reinforcement member is connected to each interior brace reinforcement at a substantially perpendicular angle. The braces are attached to the peripheral base at an encapsulation junction.

The encapsulation junction includes a plastic material or a polymer material that encapsulates the peripheral reinforcement member. The encapsulating material, in effect, forms a bushing around the rigid peripheral reinforcement member. The encapsulating material restricts the radial movement of the braces with respect to the peripheral base. The length of the peripheral reinforcement member and the surface area of the peripheral reinforcement member are selected to be great enough to resist shear, tensile, and compressive forces at the encapsulation junction transmitted from the shaft to the braces.

BRIEF DESCRIPTION OF THE DRAWINGS

FIG. 1A is an exploded, perspective view of a first embodiment of a centrifugal pump incorporating the multipartite impeller assembly.

FIG. 2A is an exploded, perspective view of the second embodiment of the centrifugal pump incorporating the multipartite impeller assembly and the shock-absorbent shaft support.

FIG. 2F is a perspective view of the shaft support for the second embodiment of the centrifugal pump showing the hub recess and the associated shaft.

FIG. 3A is an exploded, perspective view of a third embodiment of the centrifugal pump incorporating a variation of the multipartite impeller assembly.

DETAILED DESCRIPTION OF THE PREFERRED EMBODIMENTS

The present invention is directed toward a centrifugal pump having a multipartite impeller assembly. A shaft support may be incorporated into the centrifugal pump to isolate vibrations of the impeller assembly and shaft from the housing.

First Embodiment of Centrifugal Pump

Figure 1B:
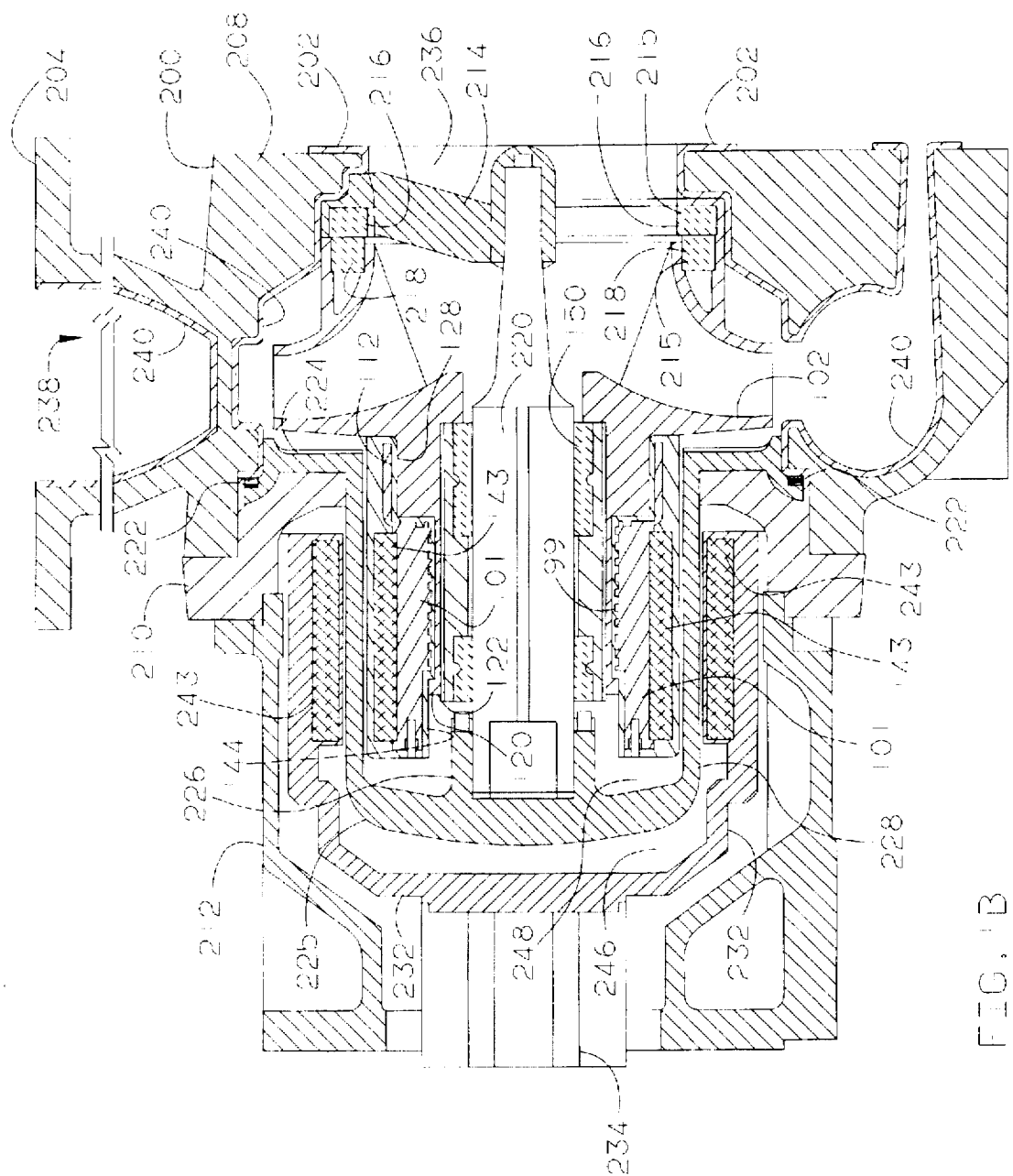
FIG. 1B is a cross-sectional view of the centrifugal pump of FIG. 1A.

FIG. 1A and FIG. 1B illustrate a first embodiment of the centrifugal pump. The pump includes a housing 200, which adjoins a shaft support or a first shaft support 214. The housing 200 houses a second shaft support 226, which may or may not be different from the first shaft support 214. The pump shaft 220 is supported by the first shaft support 214 and the second shaft support 226. A radial bearing 150 coaxially surrounds the pump shaft 220. The radial bearing 150 cooperates with the impeller assembly. The impeller assembly contains a wet-end magnetic coupler 140 which magnetically couples to the dry-end magnetic coupler 232 through the containment shell 225. The containment shell 225 separates the wet-end 248 of the pump from the dry-end 246 of the pump.

The housing 200 preferably has a plurality of housing members. As best illustrated by FIG. 1A, the housing 200 includes a first housing member 208, a second housing member 210, and a third housing member 212. The first housing member 208 and the second housing member 210 mate together with an intervening gasket 222 (i.e. an O-ring). The containment shell 225 adjoins the first housing member 208 and the second housing member 210. Pumped fluid is confined to the interior pump volume defined by the containment shell 225 and the first housing member 208.

The second housing member 210 is secured to the first housing member 208. The third housing member 212 is secured to the first housing member 208 or the second housing member 210, or both the first housing member 208 and the second housing member 210. Fasteners (not shown) may be used to join the various housing members through bores in the housing members.

The housing 200 has an inlet 236 for receiving the pumped fluid and an outlet 238 for emitting the pumped fluid. The housing 200 has an inlet flange 202 and an outlet flange 204 with bores for attaching external plumbing to the pump. The housing 200 may be constructed from cast iron, ductile iron, stainless steel, alloys, or other metals. The interior fluid-contacting surfaces of the housing 200 are preferably coated with a corrosion-resistant lining 240.

The pump shaft 220 is positioned within the housing 200 by at least one shaft support. The pump shaft 220 is preferably secured within the housing 200 by a first shaft support 214 and a second shaft support 226. The first shaft support 214 is located in the front of the pump near the impeller portion 102. Meanwhile, the second shaft support 226 is located adjacent to or integral with the containment shell 225.

The first shaft support 214 and the second shaft support 226 each have shaft retaining means for retaining the pump shaft 220. The shaft retaining means comprises a socket, a recess, an opening, or the like, which corresponds to the size and shape of the shaft end. The shaft end of the pump shaft 220 complementally mates with the shaft retaining means.

The second shaft support 226 is optimally coextensive with a rear portion or pot portion 228 of the containment shell 225. Flat mating surfaces of the pump shaft 220 engage the recess of the second shaft support 226. The pump shaft 220 engages the recess to prevent the undesired rotation of the shaft 220 for stationary shaft pumps. In the first embodiment of the present invention, the first shaft support 214 and the second shaft support 226 are preferably constructed of plastic resin or polymer resin with carbon fiber reinforcement.

The impeller assembly is coaxially located about the pump shaft 220 between the first shaft support 214 and the second shaft support 226. The impeller assembly 100 includes an impeller portion 102, a wet-end magnetic coupler 140, and a radial bearing 150. A polygonal extension 112 extending from the impeller portion 102 interlocks with a corresponding polygonal recess 128 in the wet-end magnetic coupler 140. The impeller portion 102 is fastened to the wet-end magnetic coupler 140 via a snap-fit connector 122 or snap-fit joint. Retention of the snap-fit connection is reinforced by the presence of the radial bearing 150 located adjacent to the snap-fit joint. Once the radial bearing is inserted into a tube 116, the snap-fit connector 122 is sandwiched and confined between the radial bearing 150 and the wet-end magnetic coupler 140. The outer portion of the radial bearing 150 is preferably secured to the impeller portion 102.

An axial bearing 215 is located adjacent to the front shroud 108 of the impeller portion 102 next to the first shaft support 214. The axial bearing 215 of FIG. 1A and FIG. 1B, comprises two rings. The axial bearing 215 has mating faces 242 and mounting faces 244. The mating faces 242 face each other for respective rotational movement, while the mounting faces 244 are placed in retention recesses within the first shaft support 214 and the front shroud 108. The mating faces 242 may be lubricated, but need not be lubricated, by pumped fluid which is circulated in the interior of the housing 200.

The axial bearing 215 is preferably constructed from a ceramic material such as silicon carbide. The first shaft support 214 has a cylindrical retention recess (not shown) adapted to receive a first ring 216. The front shroud 108 of the impeller portion 102 has a shroud recess 252 to receive a second ring 218. The first ring 216 may have nibs about its periphery or mounting face to prevent rotation relative to the first shaft support 214. Likewise, the second ring 218 may have nibs about its periphery or mounting face to prevent rotation relative to the impeller portion 102.

The containment shell 225 is located to the rear of the impeller assembly. The containment shell 225 is secured to the housing 200. The containment shell 225 has a rim portion 224. The containment shell 225 is preferably constructed from a nonconductive material, such as a plastic, a polymer, a fiber-reinforced plastic, or a fiber-reinforced polymer as is well known in the art. Ethylene-tetra-fluoro-ethlene (ETFE) and a fiber fabric vinyl ester composite have been reliable in practice. The containment shell 225 may also be made from stainless steel, nickel, cadmium, a metal, an alloy, or the like. The containment shell 225 confines the pumped fluid to the wet side 248 of the containment shell 225.

The dry-end magnetic coupler 232 is located in proximity to the wet-end magnetic coupler 140 on a dry side 246 of the containment shell 225. The dry-end magnetic coupler 232 has a cylindrical cavity 230 which is coaxially oriented with respect to the dry side 246 of the containment shell 225. The wet-end magnetic coupler 140 is coaxially oriented with respect a wet side 248 of the containment shell 225. The dry-end magnetic coupler 232 includes second magnetic members 243. Second magnetic members 243 may comprise magnets, rare-earth magnets, an electromagnet, a plurality of electromagnets, a torque ring, or the like. The wet-end magnetic coupler has a first magnetic coupling region which magnetically or electromagnetically couples to a second magnetic coupling region of the dry-end magnetic coupler. The dry-end magnetic coupler 232 is coupled to a drive motor (not shown) via an interface 234.

Multipartite Impeller Assembly

Figure 1C:
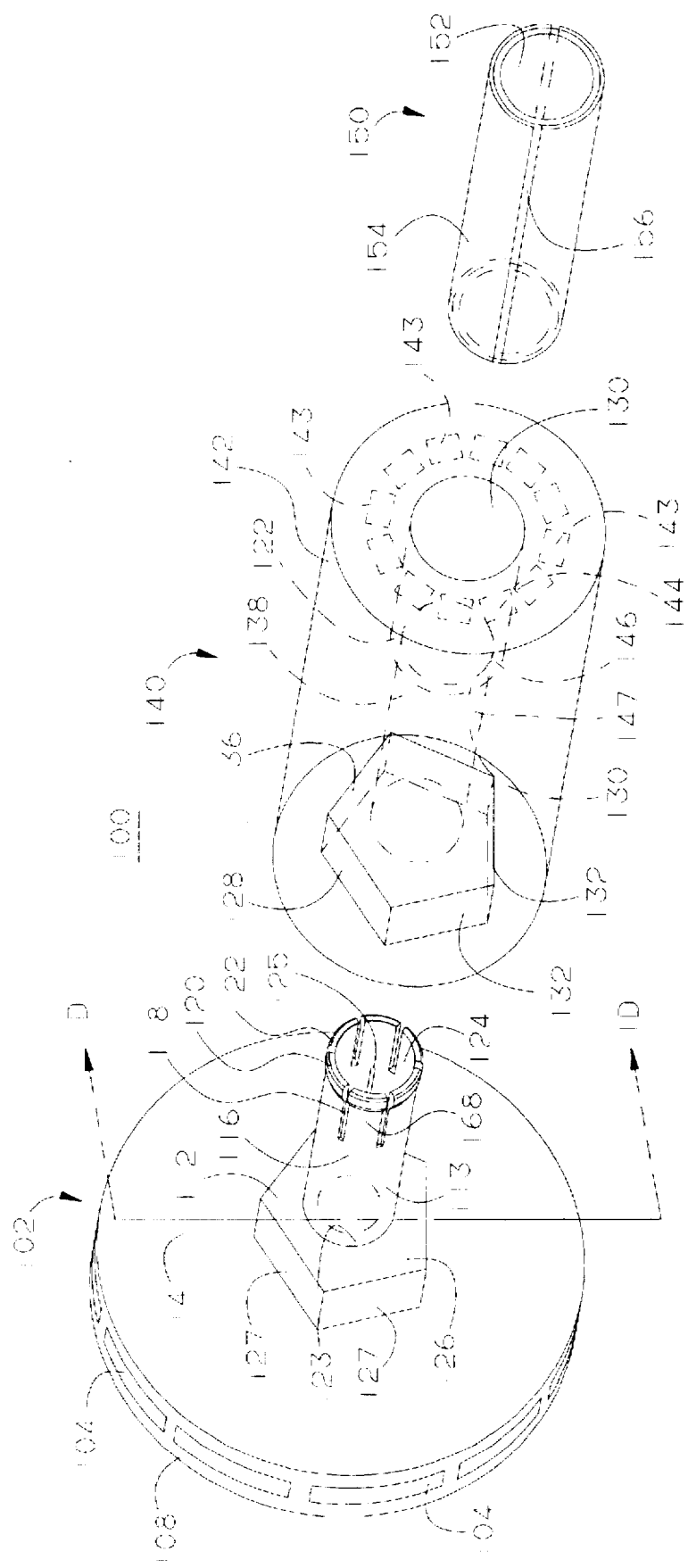
FIG. 1C is an exploded, perspective view of the impeller assembly of FIG. 1A.
Figure 1D:
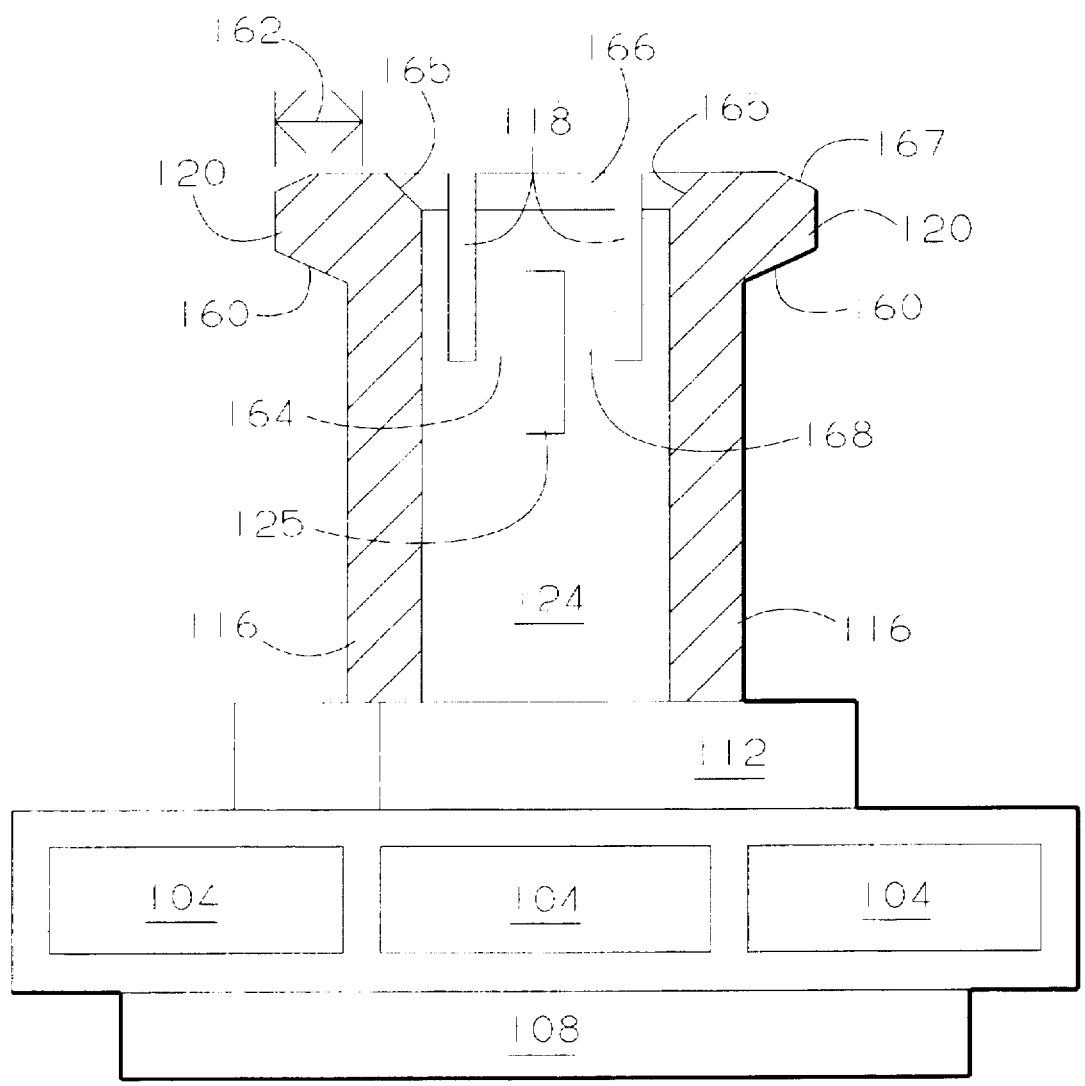
FIG. 1D is a cross-sectional view of the impeller portion as viewed along reference line 1D—1D in FIG. 1C.

FIG. 1C and FIG. 1D show the multipartite impeller assembly in greater detail than FIG. 1A and FIG. 1B do. The impeller assembly 100 includes an impeller portion 102, a wet-end magnetic coupler 140, a snap-fit connector 122, and a radial bearing 150. The impeller portion 102 interlocks and mates with the wet-end magnetic coupler 140. A snap-fit connector 122 fastens the impeller portion 102 to the wet-end magnetic coupler 140. The radial bearing 150 resides within a hollow region 138 of the wet-end magnetic coupler 140 adjacent to the snap-fit connector 122. The radial bearing 150 prevents disengagement of the snap-fit connector 122. Once assembled, the impeller portion 102, and the wet-end magnetic coupler 140, and the radial bearing 150 form a durable, cohesive unit. Yet, the impeller assembly 100 may be readily disassembled for servicing and maintenance.

The impeller portion 102 preferably has a closed-impeller configuration with a front shroud 108 and a rear shroud 114. The front shroud 108 is adjacent to the intake for the blades or vanes. The outlets 104 of the impeller portion 102 are located about the radial periphery of the impeller portion 102.

The impeller portion 102 has a tube 116 extending axially from the center of the rear shroud 114. The tube 116 is oriented coaxially with respect to the radial bearing 150 and the pump shaft 220. The cylindrical shape of the tube 116 permits the thickness of the tube 116 to be controlled during manufacturing. The cylindrical shape of the tube 116 also allows the orientation of the tube 116, with respect to the center of the impeller portion 102, to be controlled during manufacturing. The tube 116 has a substantially cylindrical tube interior 124 with ridges 125 or bearing retaining means for retaining the radial bearing 150. The tube 116 terminates in at least one snap-fit protrusion 120.

The rear shroud 114 has torque receiving means for receiving torque from the wet-end magnetic coupler 140. The torque receiving means preferably comprises the polygonal extension 112 that protrudes from the rear shroud 114. The torque receiving means receives torque from the torque transmitting means, which is associated with the wet-end magnetic coupler 140. The torque transmitting means corresponds in size and shape to the torque receiving means such that the torque transmitting means interlocks with and engages the torque receiving means.

For example, if the torque receiving means comprises the polygonal extension 112 from the impeller portion 102, then the torque transmitting means comprises the corresponding polygonal recess 128 in the wet-end magnetic coupler 140. The polygonal extension 112 interlocks with and engages its corresponding polygonal recess 128. The polygonal recess 128 is combined with the polygonal extension 112 so that the recess bottom 136 is located adjacent to the extension end 126. Rotation of the polygonal recess 128 imparts rotation to the polygonal extension 112 and to the rest of the impeller portion 102.

The polygonal extension 112 preferably has a number of sides 127 which correspond to the quantity of impeller blades such that internal forces in the impeller portion 102 are evenly distributed. For example, if the impeller portion 102 has five blades then the polygonal extension 112 is optimally pentagonal. Likewise, if the impeller has six blades, then the polygonal extension should have six sides 127.

Proportional correspondence between the number of sides 127 of the polygonal extension 112 and the number of blades produces cyclo-symmetric forces within the rear impeller shroud 114 and through the polygonal extension 112. Cyclo-symmetric forces mean, for example, that the stress at each corner of the polygonal extension 112 is approximately the same. The rear shroud 114 tends to warp less from applied stresses when forces are evenly distributed throughout the rear shroud 114. Moreover, correspondence between the number of sides 127 of polygonal extension 112 and the number of blades permits the polygonal extension 112 to have a uniform cross-sectional thickness and construction.

The impeller portion 102 is made from a corrosion-resistant plastic, a fluoroplastic, a polymer, a fiber-reinforced plastic, a plastic composite, a polymer composite, a fiber-reinforced polymer, or the like. The impeller portion 102 is preferably constructed from carbon fiber-filled ethylene-tetra-fluoro-ethlene (ETFE). Carbon fiber filler may comprise polyacrylonitrile (PAN) carbon fiber. Alternatively, the impeller portion 102 may be made from PTFE, PCTFE, PVDF, PVF, FEP, ETFE, PFE, ECTFE, EFE, or the like. An assortment of suitable corrosion resistant materials are outlined in the *Handbook of plastics, Elastomers, and Composites* by Charles A. Harper, published by McGraw-Hill, Inc. in New York, N.Y. (Second Edition 1992). The chart in Appendix C on pages C1 to C50 of the *Handbook of Plastics, Elastomers, and Composites* is hereby incorporated by reference into this specification.

The wet-end magnetic coupler 140 has a generally cylindrical exterior. The interior of the wet-end magnetic coupler is a hollow core 130. The hollow core 130 preferably includes a polygonal recess 128, a hollow region 138, and snap-fit cavity 144 located along the magnetic coupler's axis. One end of the wet-end magnetic coupler 140 contains the polygonal recess 128 with recess sides 132. The opposite end of the wet-end magnetic coupler 140 has a snap-fit cavity 144.

The hollow region 138 is located between the polygonal recess 128 and the snap-fit cavity 144. The snap-fit ledge 146 forms a boundary of the snap-fit cavity 144 that is adjacent to the hollow region 138. The hollow region 138 has a hollow radius which corresponds to the exterior radius of the tube 116 such that the tube 116 may extend axially through the hollow region 138. The snap-fit cavity 144 has a cavity size, or cavity radius, which is larger than the hollow radius of the hollow region 138. The snap-fit cavity 144 is substantially annular or cylindrical. The snap-fit cavity 144 preferably axially extends to one end of the wet-end magnetic coupler 140 to simplify manufacturing.

The wet-end magnetic coupler 140 has a first magnetic coupling region 142 including first magnetic members 143. The first magnetic members 143 may comprise electromagnets, rare-earth magnets, magnets, ferrous metals, a torque ring, magnetic members, or the like. The first magnetic coupling region 142 is encapsulated by a corrosion-resistant layer. The corrosion-resistant layer has a sufficient thickness to isolate the magnetic members 143 or ferrous metals from caustic and hazardous fluids. The magnetic members 143 are preferably arranged in a circular fashion near an end of the wet-end magnetic coupler 140 or the magnetic members 143 are arranged radially about the cylindrical periphery of the wet-end magnetic coupler 140. The first magnetic coupling region 142 cooperatively interacts with a second magnetic coupling region located in the dry-end magnetic coupler 232.

As best shown by FIG. 1B, the magnetic coupler may contain a sleeve reinforcement with a corrugated or ridged inner surface 99. The sleeve reinforcement 101 is substantially cylindrical and preferably is constructed from a metal, such as a nickel alloy or stainless steel. The ridged inner surface 99 improves adhesion of the corrosion-resistant layer (i.e. encapsulating plastic) around the magnetic members 143 and the sleeve reinforcement 101 while permitting the thickness of the corrosion-resistant layer to be controlled.

The snap-fit connector 122 joins the wet-end magnetic coupler 140 to the impeller portion 102. The snap-fit connector may comprise a cantilever snap-fit joint, an annular snap-fit joint, a discontinuous annular snap-fit joint, or the like. The snap-fit connector 122 includes at least one snap-fit protrusion 120 and a snap-fit cavity 144. The snap-fit protrusion 120, the hollow region 138, or both the snap-fit protrusion 120 and the hollow region 138 temporarily deform during the assembly process. The dimensions, geometry, and material of the snap-fit protrusion 120 are selected to deform without significant strain damage during the assembly process. Once assembled, at least one snap-fit protrusion 120 engages the snap-fit cavity 144 in a stress-free manner if external forces on the snap-fit connector 122 are ignored.

A group of snap-fit protrusions 120 is shown in FIG. 1A. Each snap-fit protrusion 120 is arched or semi-annular and extends radially from the tube 116. As best illustrated by the cross-sectional views in FIG. 1B and FIG. 1D, the snap-fit protrusion 120 preferably has a tapered edge 160 which rests against or near a snap-fit ledge 146 when assembled. The tapered edge 160 permits the snap-fit protrusion 120 to be disengaged and removed from the snap-fit cavity 144 when desired. The snap-fit protrusion 120 has a deflection dimension 162 which is approximately equal to the radial distance between the tube exterior 113 and utmost radial point of the snap-fit protrusion 120.

The snap-fit protrusion 120 optimally has a beveled interior corner 165 and a beveled exterior corner 167. The beveled interior corner 165 is sloped to allow the radial bearing 150 to be easily inserted into the tube interior 124. The beveled exterior corner 167 is sloped to allow the tube 116 to be easily inserted into the hollow region 138 of the hollow core 130. In alternate embodiments, the snap-fit protrusion may be shaped like a spear, a hook, stud, a bead, or the like.

The tube 116 has axial slots 118 that divide tube 116 into a series of semi-annular arms 168 with arched cross sections. The semi-annular arms 168 have a first end 164 located near the deepest portion of the axial slot 118 and a second end 166 located near or coextensive with the snap-fit protrusion 120. Such a snap-fit connector as shown in FIG. 1A is sometimes referred to as a discontinuous annular snap-fit joint.

Discontinuous annular snap-fit joints have characteristics similar to cantilever arm snap-fit joints for dimensioning and design purposes. Where the snap-fit connector 122 is a discontinuous annular snap-fit joint, the permissible deflection for each semi-annular arm is given by the formulae $D = G \epsilon l^2 / r_0$, where D is the permissible deflection, G is a geometric factor, ε is the permissible strain at an outer fiber near the first end 164 of the arm, l is the length of the semi-annular arm 168 measured from the first end 164 to the second end 166, and $r_0$ is the exterior or outer radius of the tube 116. The length of the semi-annular arm 168 is approximately equal to the axial length of each axial slot 118. The permissible deflection D or deflection dimension 162 is approximately equal to the minimum radial dimension or snap-fit ledge dimension 147 of the snap-fit cavity 144. The geometric factor G is based upon the angular length of the arc of the semi-annular arm 168 and the ratio of the exterior tube radius to the interior tube radius of the tube 116. The permissible strain at the outer fiber near the first end 164 of the arm depends upon the material composition. For example, whether or not the material is reinforced with a filler such as fiber glass or carbon fiber affects the permissible strain.

The snap-fit connector 122 optimally allows for separation of the impeller portion 102 from the wet-end magnetic coupler 140. To further facilitate ease of disassembly, radial bores may be placed in the wet-end magnetic coupler 140 to permit the application of a radially inward force to release the snap-fit connector 122. On the other hand, if an inseparable or permanent snap-fit connection were desired then the tapered edge 160 would be replaced by an orthogonal edge. The orthogonal edge would be substantially orthogonal to the tube exterior 113 or the outer surface of the tube 116, preventing easy disassembly of the impeller portion 102 from the wet-end magnetic coupler 140.

The retention force or separating force of the snap-fit connector means 122 equals the permissible deflection force of the arm plus the friction force. The separating force is designed to accommodate two countervailing objectives. The first objective is to prevent the impeller portion 102 from separating from the wet-end magnetic coupler 140 during normal pump operation. The second objective is to allow ready disassembly of the pump for maintenance or part replacement. The countervailing objectives are achieved by the presence of the radial bearing 150, a sleeve, or a bushing which prevents disassembly of the snap-fit connector 122 by preventing radial flexing of at least one snap-fit protrusion 120. To further prevent undesired separation of the impeller portion 102 and the wet-end magnetic coupler 140, the separation force is selected based upon the strain-dependent modulus or secant modulus of elasticity of the material, the permissible strain, the length of the semi-annular arm 168, and the section modulus according to practices known to one of ordinary skill in the art.

For annular snap-joints or discontinuous annular snap joints, the separating force may depend upon the location of the snap-fit ledge 146 that defines the boundary of the snap-fit cavity 144 in the tube interior 124. If the snap-fit cavity 144 is located near an end of the tube 116 when the impeller portion 102 is coupled to the magnetic coupler 104, then the separating force is typically less than if the snap-fit cavity 144 is located remotely from the end of the tube 116. In particular, if the snap-fit ledge 146 is roughly located an axial distance that exceeds a minimum axial distance from the tube end, then the separating force is increased compared to where the snap-fit ledge 146 is located closer than the minimum axial distance to the tube end. The minimum axial distance is calculated by: first, determining the product of the tube diameter and the tube wall thickness of the tube 116; second, taking the square root of the product; third, multiplying the resultant square root by two.

The radial bearing 150 has an inner surface 152 and an outer surface 154. The inner surface 152 made from may be a ceramic material, while the outer surface 154 is made from a plastic, a plastic composite, a polymer, a polymer composite, a fiber-reinforced plastic, or the like. The inner surface 152 cooperates with a shaft that is coaxially surrounded by the inner surface 152. The outer surface 154 preferably has a retaining channel 156 which corresponds to a ridge 125 in the tube interior 124 of the tube 116. The ridge 125 and the retaining channel 156 are engaged so that the radial bearing 150 rotates with the impeller portion 102. The outer surface of the bearing is substantially cylindrical and inhibits radial movement of the snap-fit connector 122 which would otherwise tend to release the snap-fit connection. An impeller ledge 123 axially confine the radial bearing 150.

Second Embodiment of Centrifugal Pump

Figure 2B:
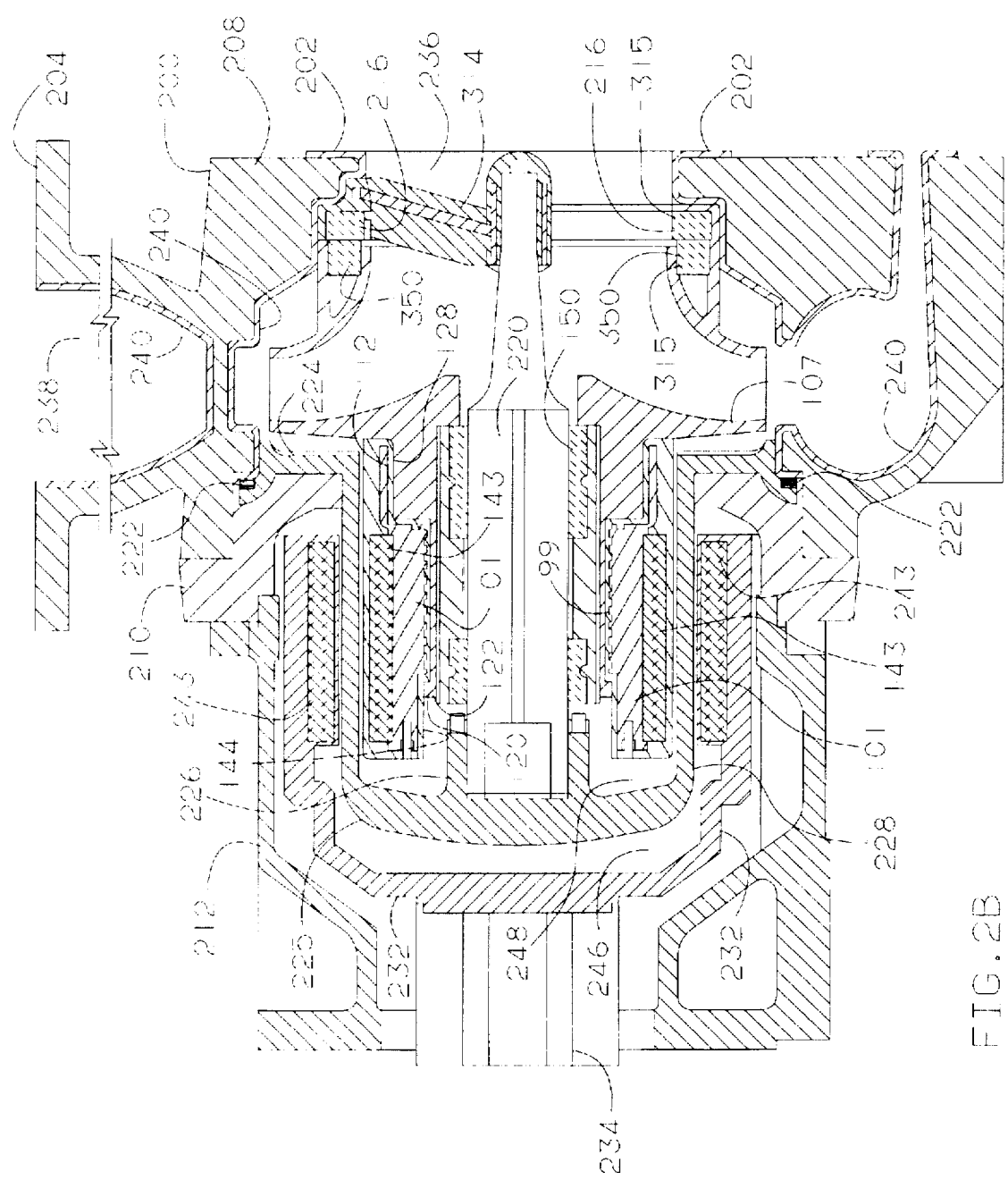
FIG. 2B is a cross-sectional view of the pump of FIG. 2A.

FIG. 2A and FIG. 2B show a second embodiment of the centrifugal pump of the present invention. The second embodiment features an axial bearing 315 with a plurality of pads 350 arranged in a circular fashion. In addition, the second embodiment features a shock-absorbent, reinforced shaft support 314 or a first shaft support.

The centrifuigal pump of FIG. 2A and FIG. 2B is similar to the pump previously illustrated in FIG. 1A and FIG. 1B except for the axial bearing 315, the front shroud 109, and the shaft support 314. The axial bearing 315 includes pads 350 arranged in a circular fashion. As illustrated in FIG. 2A, the pads 350 are located in shroud recesses 352 in the front shroud 308 of the impeller portion 107. Each of the shroud recesses 352 correspond in size and shape to the pad size and pad shape. The shroud recesses 352 interlock with and retain the pads 350.

Reinforced Shaft Support

Figure 2C:
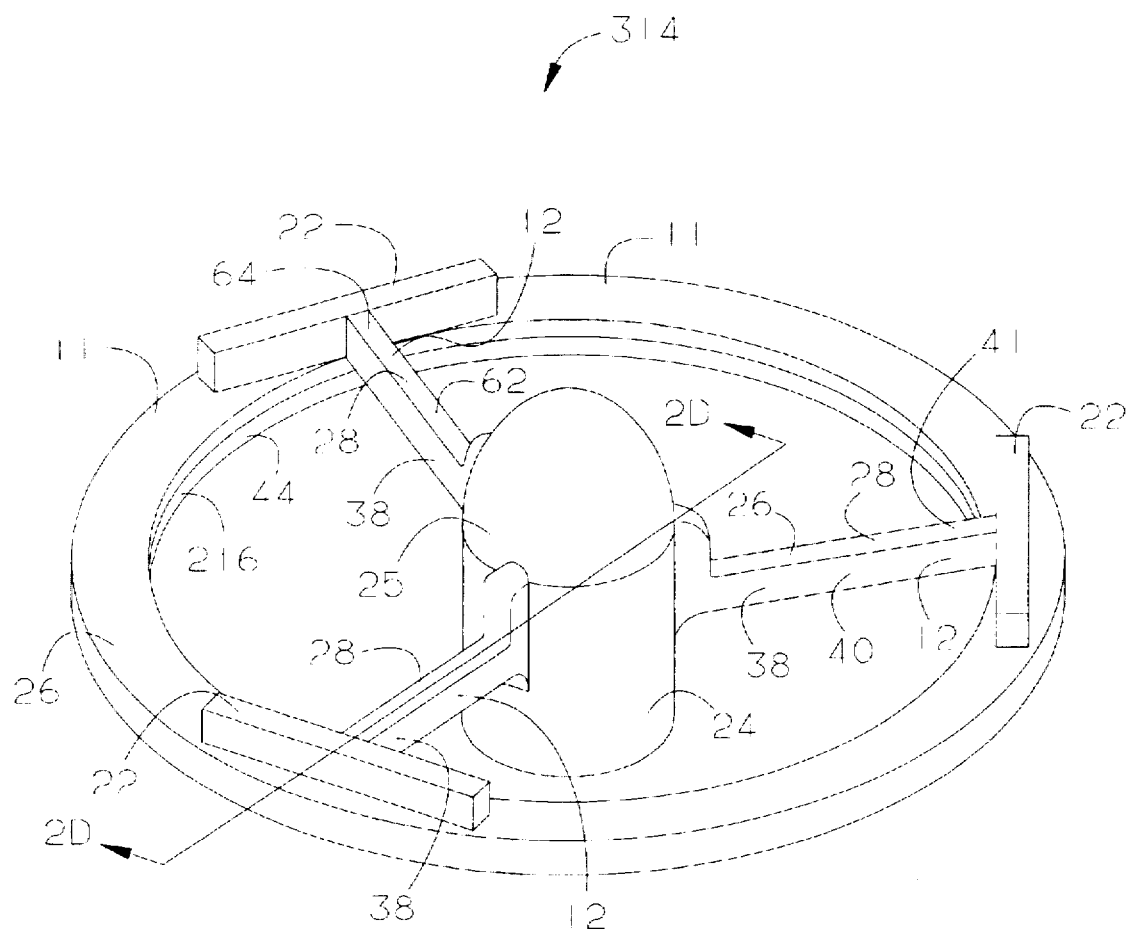
FIG. 2C is a perspective view of the shaft support for the second embodiment of the centrifugal pump, wherein the front side of the shaft support is depicted.

FIG. 2C through FIG. 2F, inclusive, show the reinforced shaft support 314. The reinforced shaft support 314 includes a hub 24, braces 12, and a peripheral base 11. The hub 24 interfaces with a stationary shaft (or a rotatable shaft of the centrifugal pump). The braces 12 extend radially from the hub 24 toward the peripheral base 11. While three braces are shown in FIG. 2C, in practice, any number of braces 12 greater than or equal to one may be used to make the shaft support 314. The braces 12 are attached to the hub 24 and secured to the peripheral base 11.

Figure 2D:
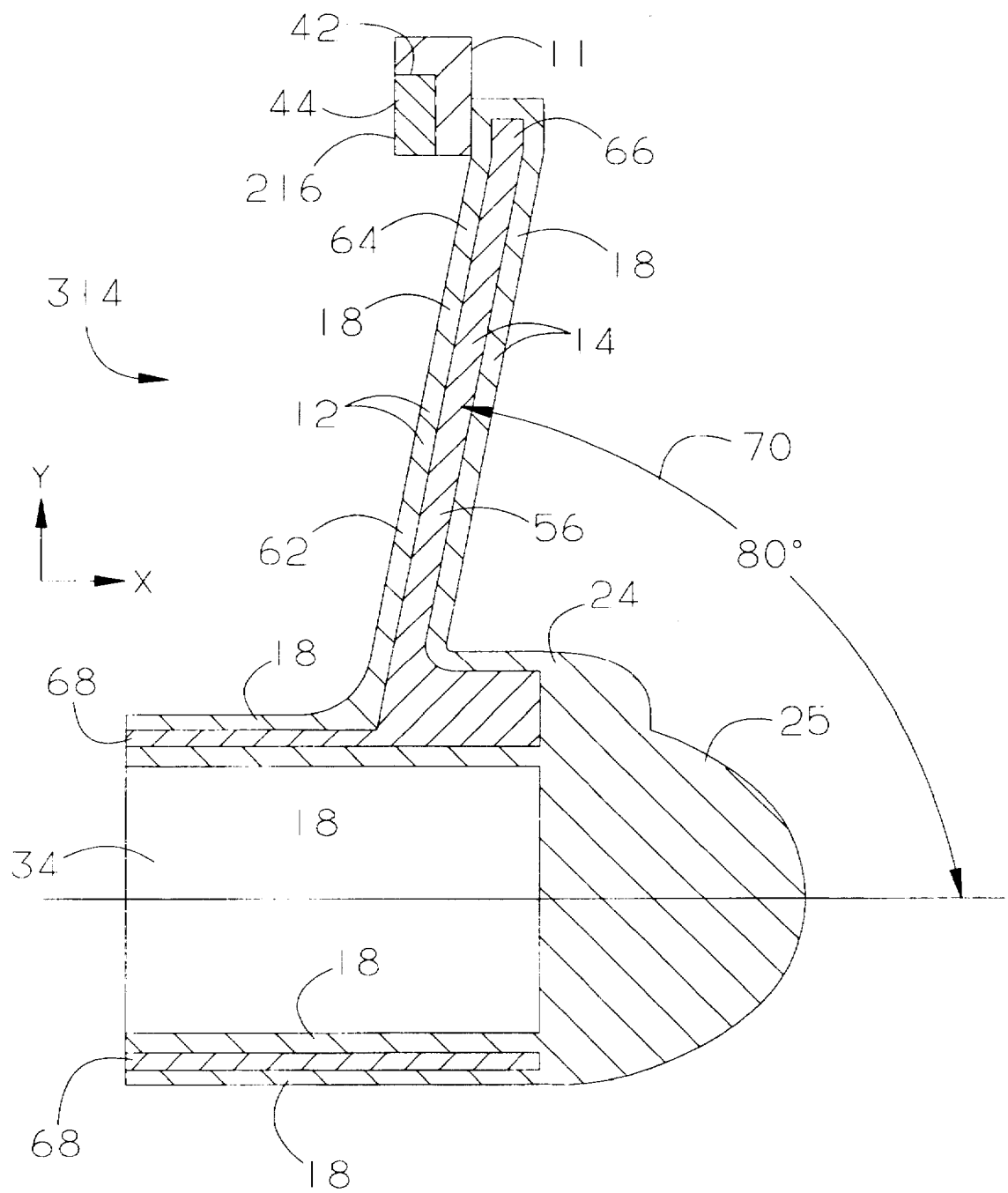
FIG. 2D is a cross-sectional view of the shaft support as viewed along reference line 2D—2D in FIG. 2C.
Figure 2E:
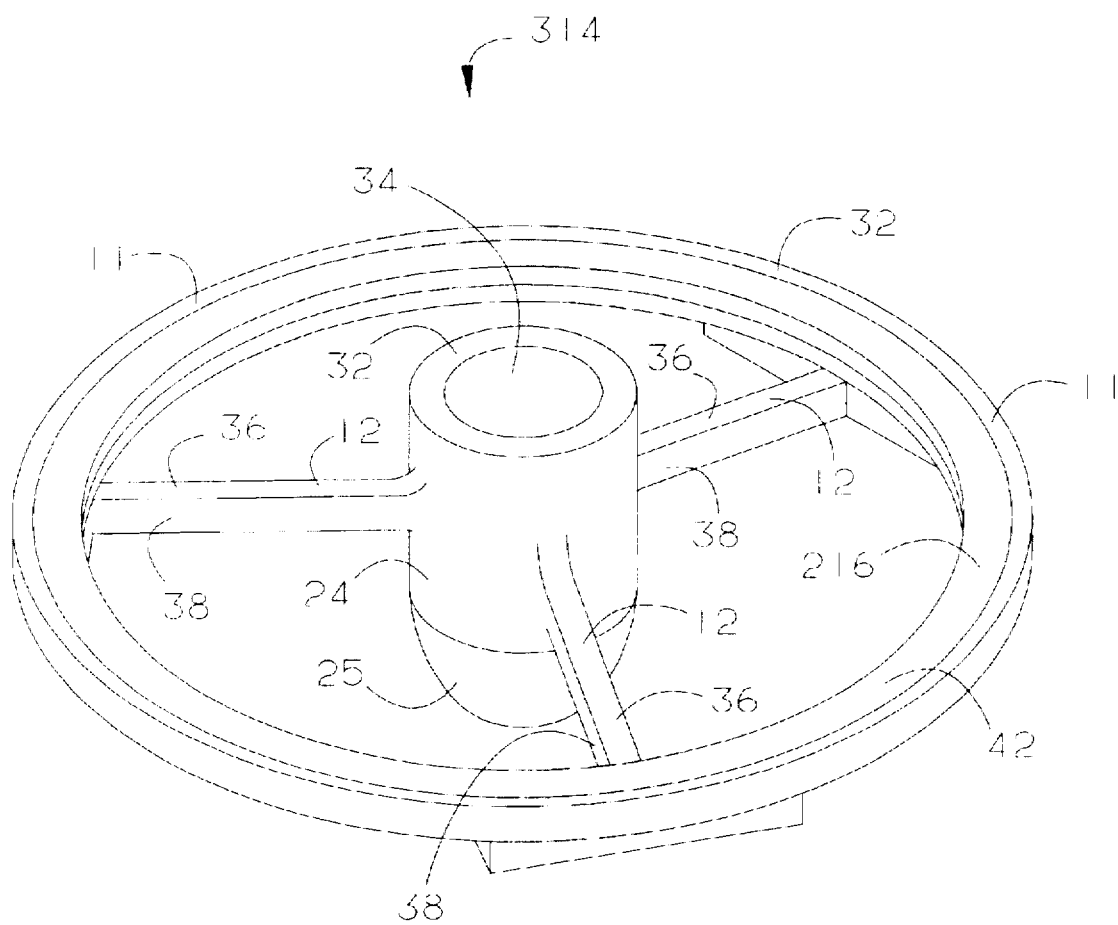
FIG. 2E is a perspective view of the shaft support for the second embodiment of the centrifugal pump, showing a rear side of the shaft support.
Figure 21:
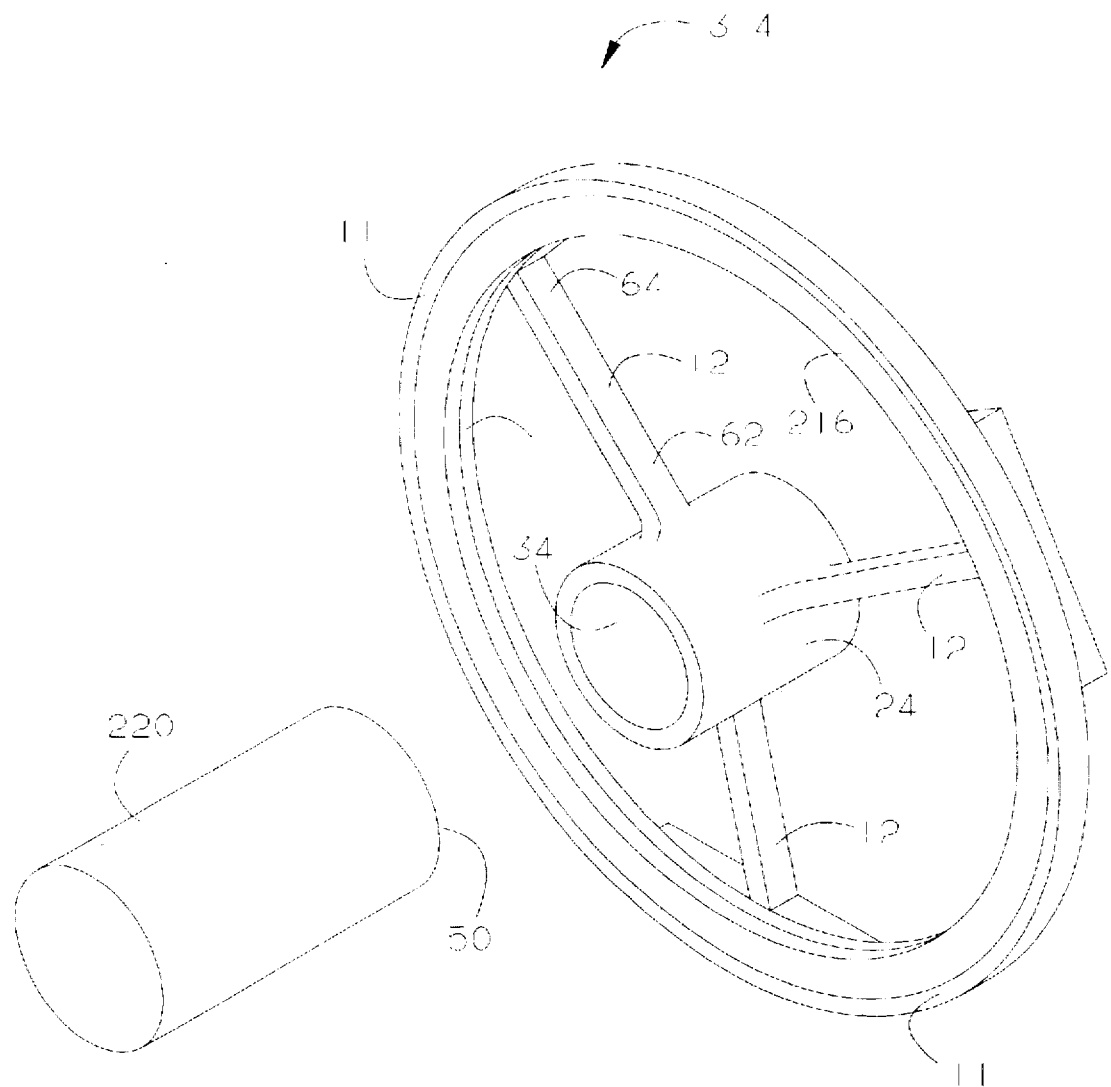
Figure 2G:
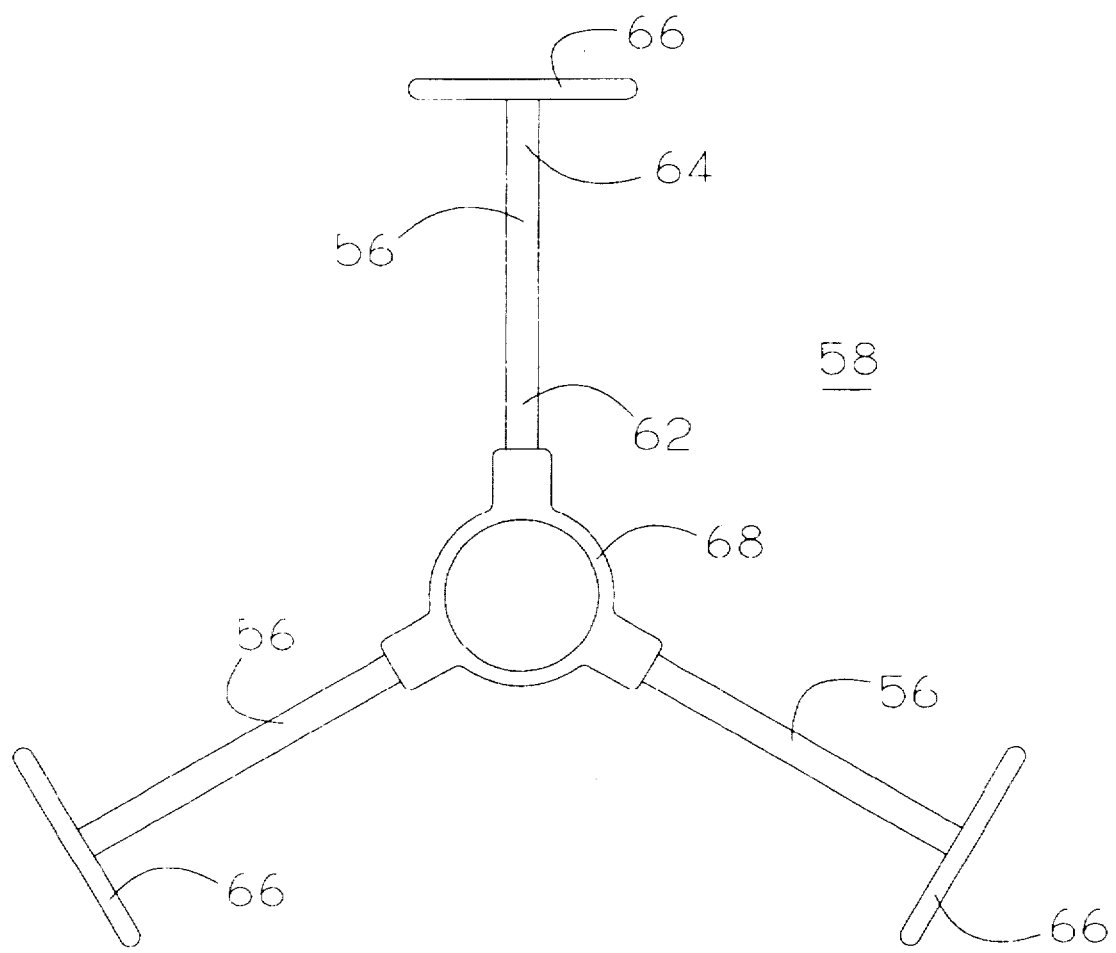
FIG. 2G is a plan view of the inner reinforcement of the shaft support for the second embodiment of the centrifugal pump.

As best illustrated FIG. 2D and in FIG. 2G, a reinforcing framework is located in the interior of the shaft support 314, while the exterior is encapsulated in a corrosion-resistant exterior layer 18. The reinforcing framework or reinforcing spider 58 includes interior brace reinforcements 56 and peripheral reinforcement members 66. The interior brace reinforcements 56 extend radially from the hub reinforcement of the hub 24 within the braces 12. The peripheral reinforcement members 66 are preferably located perpendicular to the interior brace reinforcements 56. The braces 12 are secured to the peripheral base 11 via encapsulation junctions 22. Each encapsulation junction 22 includes an encapsulating material that encapsulates the corresponding peripheral reinforcement member 66.

The encapsulating junction 22 and the peripheral base 11 are entirely or partially constructed from a plastic, a polymer, or a resilient material. The peripheral base 11 and the encapsulation junction 22 cooperate to dampen or attenuate radial forces transmitted to the shaft support 314 via the pump shaft 220. The axial bearings 315, the radial bearings 150, and various mounting fasteners may be subjected to reduced vibrations because the shaft support 314 partially isolates the pump shaft 220 from the remainder of the pump, while the shaft support maintains a proper orientation of the shaft 220. The shaft support may retain the first wear ring 216 in an annular recess 42 as best illustrated in FIG. 2E. where the first wear ring 216 is cut away to reveal the annular recess 42.

FIG. 2C through FIG. 2E illustrate the fluid-dynamic shape of the hub 24 and the braces 12. The shaft support 314 and the hub 24 have a front side 26 and a rear side 32. The front side 26 of the hub 24 is fluid-dynamically shaped to provide low resistance to fluids traveling past the hub 24. In particular, the front side 26 of the hub 24 has a streamlined nose 25. The streamlined nose 25 may be substantially spherical or pyramidal. The streamlined nose 25 faces the fluid intake. Meanwhile, the rear side 32 of the hub 24 interfaces with the pump shaft 220 of the centrifugal pump. The rear side 32 of the hub 24 has a hub recess 34 for interlocking with the pump shaft 220.

The braces 12 are streamlined with respect to the anticipated fluid flow and provide structural rigidity to maintain proper alignment of the pump shaft 220 within the pump. The braces 12 and the peripheral base 11 bound hollow areas through which fluid may flow when the shaft support 314 is incorporated into a centrifugal pump. Each brace cross section 14 is optimized to minimize resistance to fluid flow through the hollow areas or sectors. The braces 12 have brace cross sections 14 defined by a brace exterior that may be substantially rectangular, triangular, elliptical, circular, or any aerodynamic shape.

Each brace 12 has a frontal surface area 28 and a lateral surface area 38 that are proportioned to minimize fluid resistance through the hollow areas or sectors. The frontal surface area 28 is the exterior surface of the brace 12 that faces the fluid inlet 236. In contrast, the lateral surface area 38 is parallel to the fluid flow. A portion of the lateral surface area 38 is substantially orthogonal relative to a portion of the frontal surface area 28. The frontal surface area 28 is optimally less than or equal to the lateral surface area 38.

The lateral surface area 38 has an axial dimension 40 while the frontal surface area 28 has an frontal dimension 41. The axial dimension 40 is sized to give the brace rigidity rather than to minimize any resistance to fluid flow poised by the lateral surface area 38. Therefore, the peak axial dimension 40 is preferably larger than the peak frontal dimension 41.

FIG. 2D and FIG. 2G illustrate the reinforcing framework that includes an interior brace reinforcement 56 and a peripheral reinforcement member 66. As best illustrated by FIG. 2D, the braces 12 preferably comprise an interior brace reinforcement 56 encapsulated in a corrosion-resistant exterior layer 18. The interior brace reinforcement 56 provides the requisite compressive and shear strength for the braces 12 to tolerate both axial and radial forces. Meanwhile, the corrosion-resistant exterior layer 18 protects the interior brace reinforcement 56. The reinforcing framework, including the interior brace reinforcement 56, is preferably a metal, such as carbon steel, stainless steel, a nickel alloy, or the like. Suitable nickel alloys for the inner reinforcement are commercially available under the trademarks of Hastelloy and Inconel. Hastelloy is a registered trademark of Haynes International. Inc., while Inconel is a trademark of Inco Alloys International. The corrosion-resistant material for the exterior layer 18 may be a fluoroplastic material such as PTFE, PCTFE, PVDF, PVF, FEP, ETFE, PFE, ECTFE, EFE, or the like. Other suitable corrosion resistant materials are outlined in the Handbook of Plastics, Elastomers, and Composites by Charles A. Harper, published by McGraw-Hill, Inc. in New York, N.Y. (Second Edition 1992). The chart in Appendix C on pages C1 to C50 of the Handbook of Plastics, Elastomers, and Composites is hereby incorporated by reference into this specification.

FIG. 2D shows a side view of the reinforcing spider 58 which is encapsulated by a corrosion-resistant exterior layer 18 or an outer sheath. The brace 12 is tilted with respect to an axis of the shaft 220. The braces 12 may be divided into two portions: an inner brace portion 62 and an outer brace portion 64. The inner brace portion 62 is the portion closest to the hub 24, while the outer brace portion 64 is furthest from the hub 24 and closest to the peripheral base 11. The outer brace portion 64 is optimally tilted more toward the fluid inlet 236 than the inner brace portion 62.

The tilt angle is preferably selected to balance the axial and radial components of force placed upon the brace 12 from the pump shaft 220. In centrifugal pumps designed for high flow rates at low pressure heads, the impeller assembly typically places greater radial forces on the shaft than axial forces. Centrifugal pumps with high flow rates and low pressure heads may, for example, be identified by impeller intakes 103 that exceed a threshold size, such as two and one-half inches in radius.

The tilt angle 70 of the reinforced brace is defined by an X component and a Y component. The X component of the tilt angle 70 is less than the Y component of the tilt angle. Consequently, the X component of the brace 12 is preferably shorter than the Y component of the brace 12 and its corresponding interior brace reinforcement 56. In other words, the X component of the reinforcement has a first length in the X direction that is proportional to the potential estimated axial forces, while the Y component of the reinforced brace has a second length in the Y direction that is proportional to the potential estimated the radial forces. Here the illustrated embodiment of FIG. 2D, the tilt angle 70 is approximately 80 degrees between the shaft axis and each brace 12.

FIG. 2G shows the reinforcing framework or the reinforcing spider 58. The reinforcing spider 58 has a hub reinforcement 68, interior brace reinforcements 56, and peripheral reinforcement members 66. The hub reinforcement 68 provides an inner reinforcement for the hub 24. The hub reinforcement 68 may be substantially cylindrical. The cross section of the interior brace reinforcements 56 may be circular, elliptical, columnar, or shaped in other ways. The interior brace reinforcements 56 extend radially from the hub reinforcement 68. The interior brace reinforcements 56 are perpendiculary attached to peripheral reinforcement members 66. The union of the interior brace reinforcements 56 and the peripheral reinforcement members 66 are located near the peripheral base 11. The reinforcing spider 58 is encapsulated by a corrosion-resistant exterior layer 18 to form the shaft support 314 of the present invention.

The peripheral reinforcement member 66 is preferably a straight or rectilinear member which may be tangential to an annular, peripheral base 11. The braces 12 are attached to the peripheral base 11 at an encapsulation junction 22. The encapsulation junction 22 has a plastic material or a polymer material that surrounds the peripheral reinforcement member 66. The length of the peripheral reinforcement member 66 and the surface area of the peripheral reinforcement member 66 are selected to be great enough to resist shear, tensile, and compressive forces at the encapsulation region 22 transmitted from the pump shaft 220 to the braces 12.

The peripheral base 11 is a substantially annular member in the preferred embodiment. The peripheral base 11 has a front side 26 and a rear side 32. The peripheral base has securing means for securing the braces 12 to the peripheral base 11. The securing means preferably comprises the encapsulation junction 22 of the base 11.

As best illustrated in FIG. 2C and FIG. 2D, the encapsulation junction 22 extends from the front side 26 of the peripheral base 11. The encapsulation junction 22 is an outer layer of corrosion-resistant material attached to a peripheral reinforcement member 66 or the like. The braces 12 are encapsulated with a sufficient volume of corrosion-resistant material to affix the braces 12 to the peripheral base 11 for anticipated design loads. The corrosion resistant material used for the encapsulation junction 22 is preferably a plastic material or a polymer material that surrounds the peripheral reinforcement member 66. The length and size of the peripheral reinforcement member 66 and the surface area of the peripheral reinforcement member 66 are selected to be great enough to resist shear, tensile, and compressive forces at the encapsulation region 22 transmitted from the pump shaft 220 to the braces 12. For example, here each peripheral reinforcement member 66 occupies an arc about the peripheral base 11 of less than or equal to thirty degrees. Likewise, each encapsulation junction 22 occupies an arc about the peripheral base 11 of less than or equal to thirty degrees.

FIG. 2F shows a first embodiment of the hub for the shaft support 314 of the present invention. The shaft support 314 has interlocking means for interlocking the hub 24 and the shaft 220. The interlocking means preferably comprises a hub recess 34 located in the hub 24. The hub recess 34 has a recess shape and a recess size that corresponds to the shaft shape and a shaft size of the pump shaft 220 or a shaft end 50. The shaft end 50 is inserted into the hub recess 34. Here, the hub recess 34 is substantially cylindrical. An additional embodiment of the hub is described subsequently in the specification.

Third Embodiment of the Centrifugal Pump

Figure 3B:
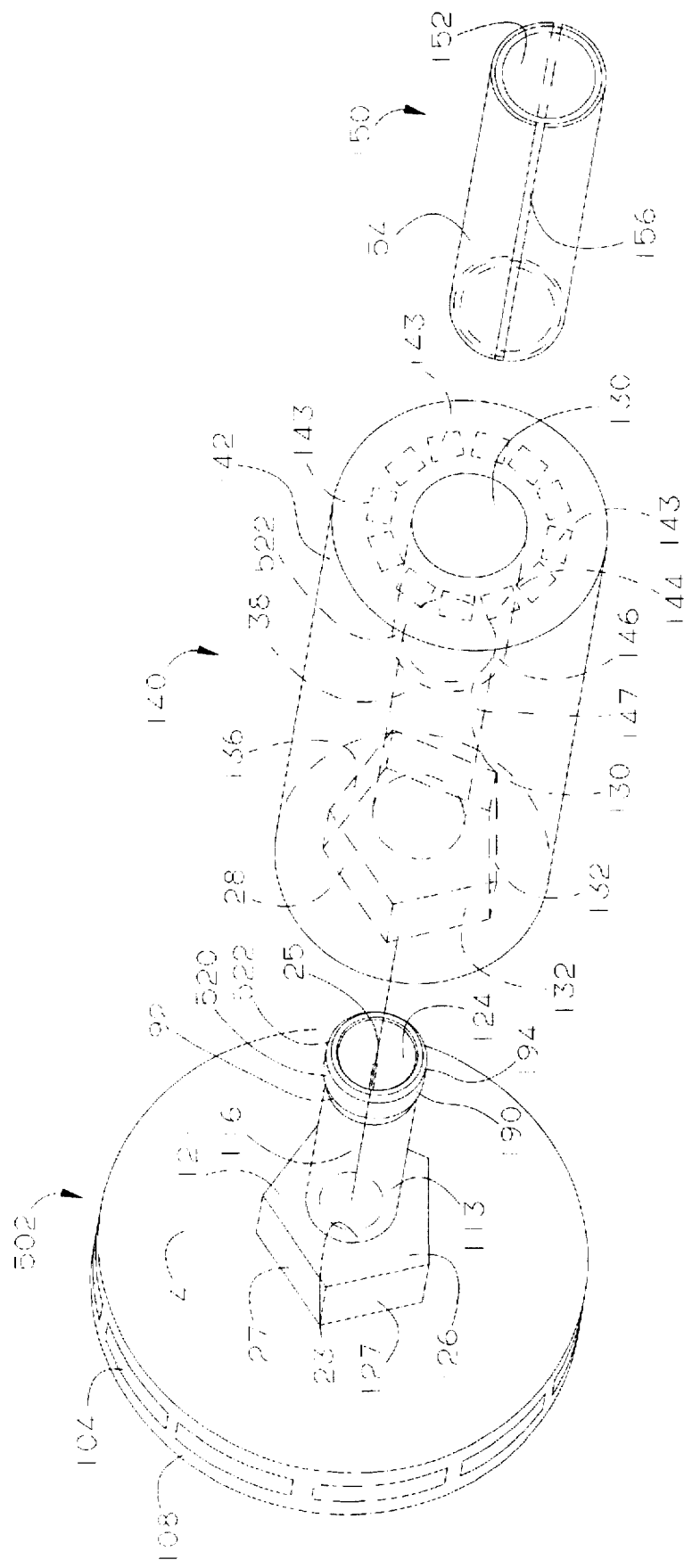
FIG. 3B is an exploded perspective view of the multipartite impeller assembly generally depicted in FIG. 3A.

FIG. 3A and FIG. 3B depict a third embodiment of the centrifugal pump of the present invention. The third embodiment of the centrifugal pump features a substantially annular snap-fit protrusion 520 for an annular snap-fit connector 522, rather than a discontinuous snap-fit connector as previously illustrated in FIG. 1A and FIG. 1B. In addition, the third embodiment of the centrifugal pump features the shaft support 314 previously described in conjunction with the second embodiment of the centrifugal pump. The annular snap fit protrusion 520 has a central annular peak 190 or summit which has a greater radius than the tube radius of the tube 516. A front slope 192 and rear slope 194 extend radially downward toward the tube axis from the central annular peak 190.

Here, in the illustrative example of FIG. 3A and FIG. 3B, the central annular peak comprises a summit area defined by a flat peak between the front slope 192 and the rear slope 194. However, in other embodiments, the central annular peak 190 may be a narrow pointed ridge bounded by a front slope 192 and a rear slope 194. The central annular peak 190 has a radial height above the tube radius. The radial height is selected based upon the permissible deflection of the annular snap-fit protrusion 520 in accordance with the engineering principles previously discussed in this specification. The presence of the front slope 192 facing the rear shroud 114 improves the ability to disassemble the impeller portion 502 from the wet-end magnetic coupler 140.

Fourth Embodiment of the Centrifugal Pump

Figure 4:
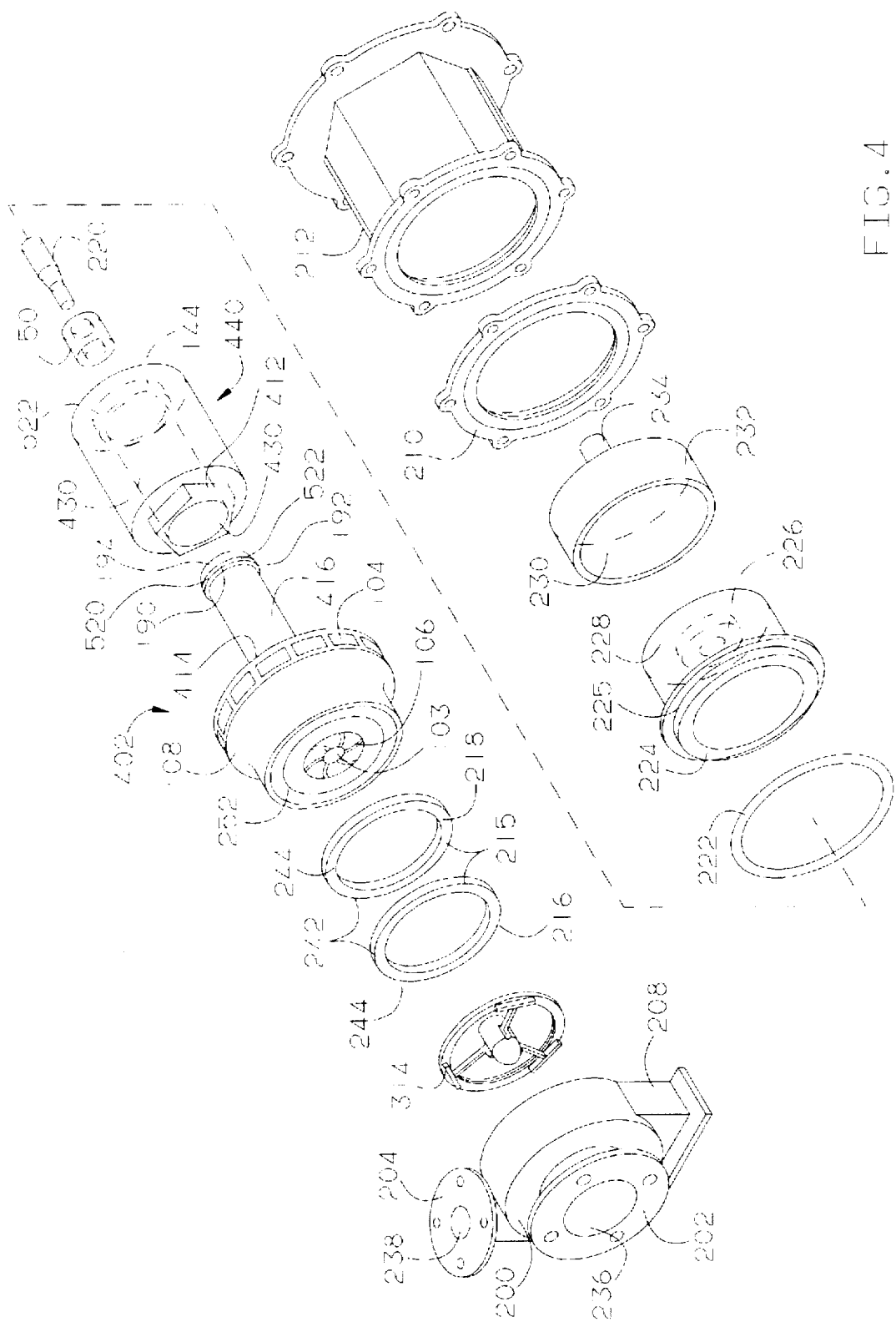
FIG. 4 is an exploded perspective view of a fourth embodiment of the centrifugal pump with a polygonal recess located in the rear shroud of an impeller portion.

FIG. 4 depicts a fourth embodiment of the centrifugal pump in which the rear shroud 414 of the impeller portion 402 has a polygonal recess and in which the front end of the wet-end magnetic coupler 440 has a corresponding polygonal extension 412. The polygonal recess has a size and shape corresponding to the size and shape of the polygonal extension 412. The polygonal extension 412 interlocks with the polygonal recess 428. The impeller portion 402 is secured to the wet-end magnetic coupler 440 via a snap-fit connector 522 associated with a tube 416. The magnetic coupler 440 has a hollow core 430.

Fifth Embodiment of the Centrifugal Pump

Figure 5:
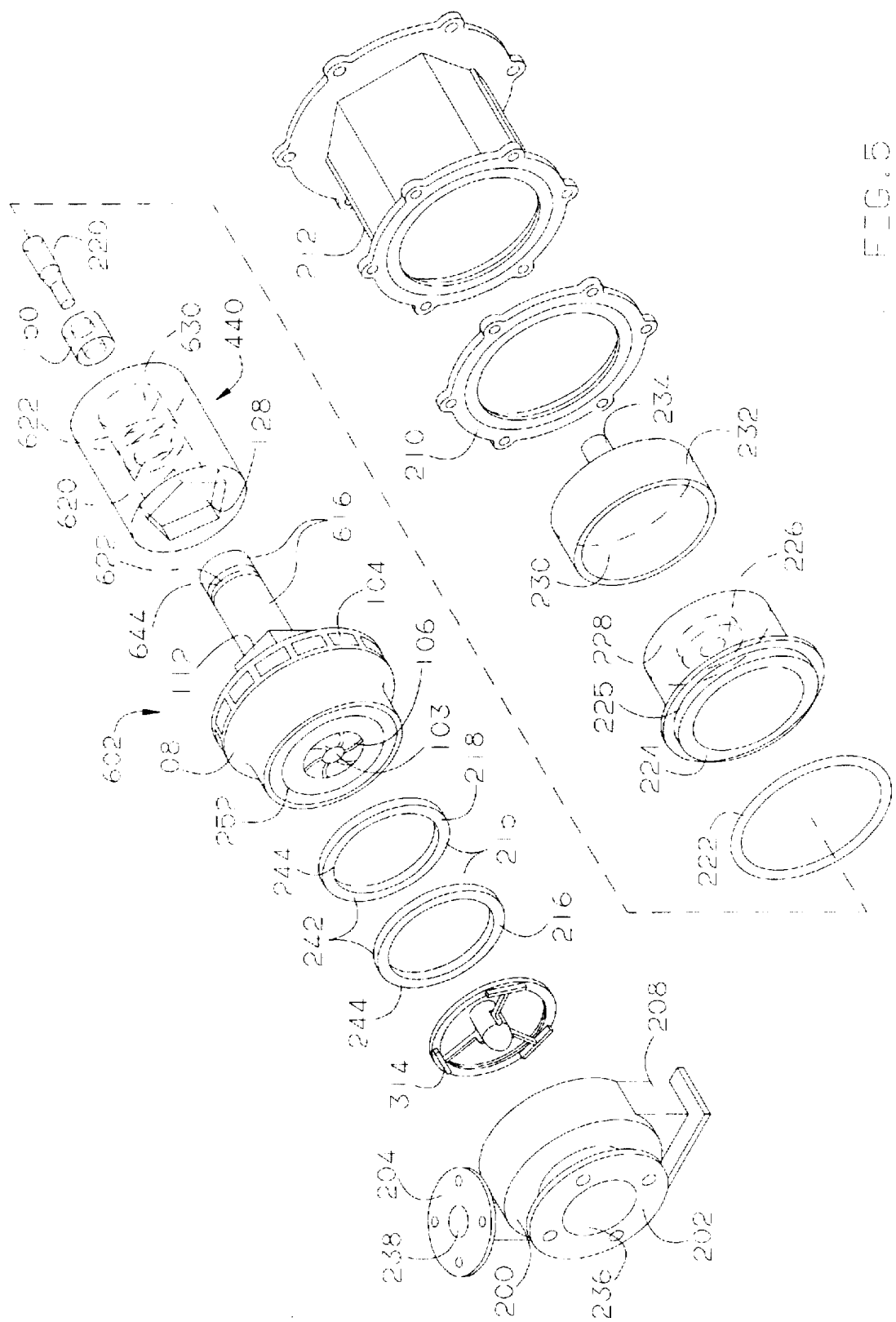
FIG. 5 is an exploded perspective view of a fifth embodiment of the centrifugal pump with a snap-fit cavity located in the tube.

FIG. 5 depicts a fifth embodiment of the centrifugal pump with a different snap-fit connector 622 than previously depicted in this specification. In particular, the tube 616 of the impeller portion 602 has an annular snap-fit cavity 644 and the wet-end magnetic coupler 640 has a corresponding snap-fit protrusion 620. The snap-fit protrusion 620 extends radially inward from a hollow core 630 of the wet-end magnetic coupler 640. The snap-fit cavity 644 has a size and shape corresponding to the size and shape of the snap-fit protrusion 620. The snap-fit protrusion 620 interlocks with the snap-fit cavity 644. The impeller portion 602 is secured to the wet-end magnetic coupler 640 via the snap-fit connector 622. Meanwhile, the shaft support 314 compensates for minor imbalances in the impeller assembly.

Variations of the Shaft Support

Figure 6:
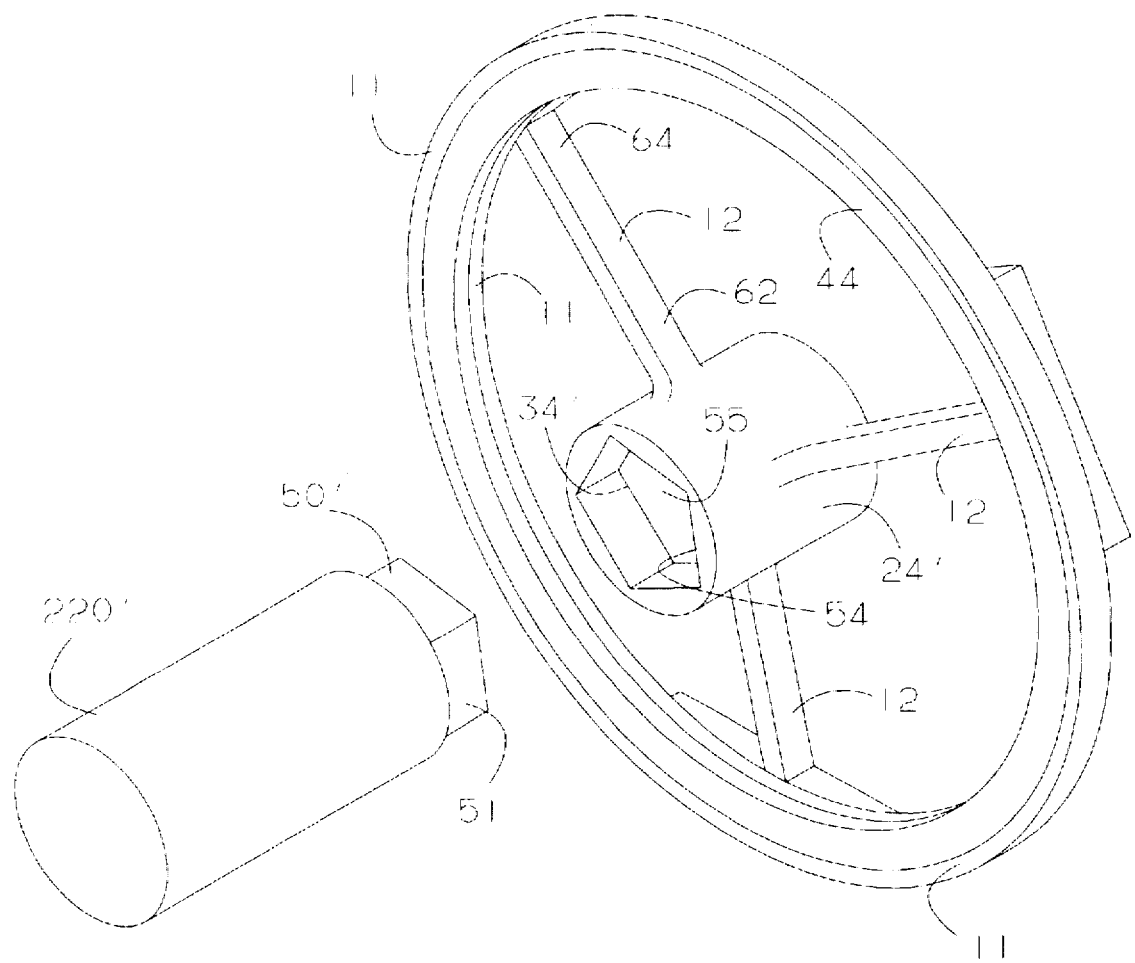
FIG. 6 is an alternate embodiment of the hub recess for the shaft support.

FIG. 6 is an alternate embodiment of the hub for the shaft support; the alternate hub 24' has a socket 34'. The socket 34' interfaces with a shaft 220' having a plug end 51 located at a shaft end 50'. The socket 34' has socket walls 54 and a socket bottom 55 which correspond to the size and the shape of the pump shaft 220'; specifically, the plug end 51. The socket 34' is used to inhibit the rotational movement of the pump shaft 220' for stationary shaft configurations. A ring 44 located in the alternate shaft support.

Figure 7:
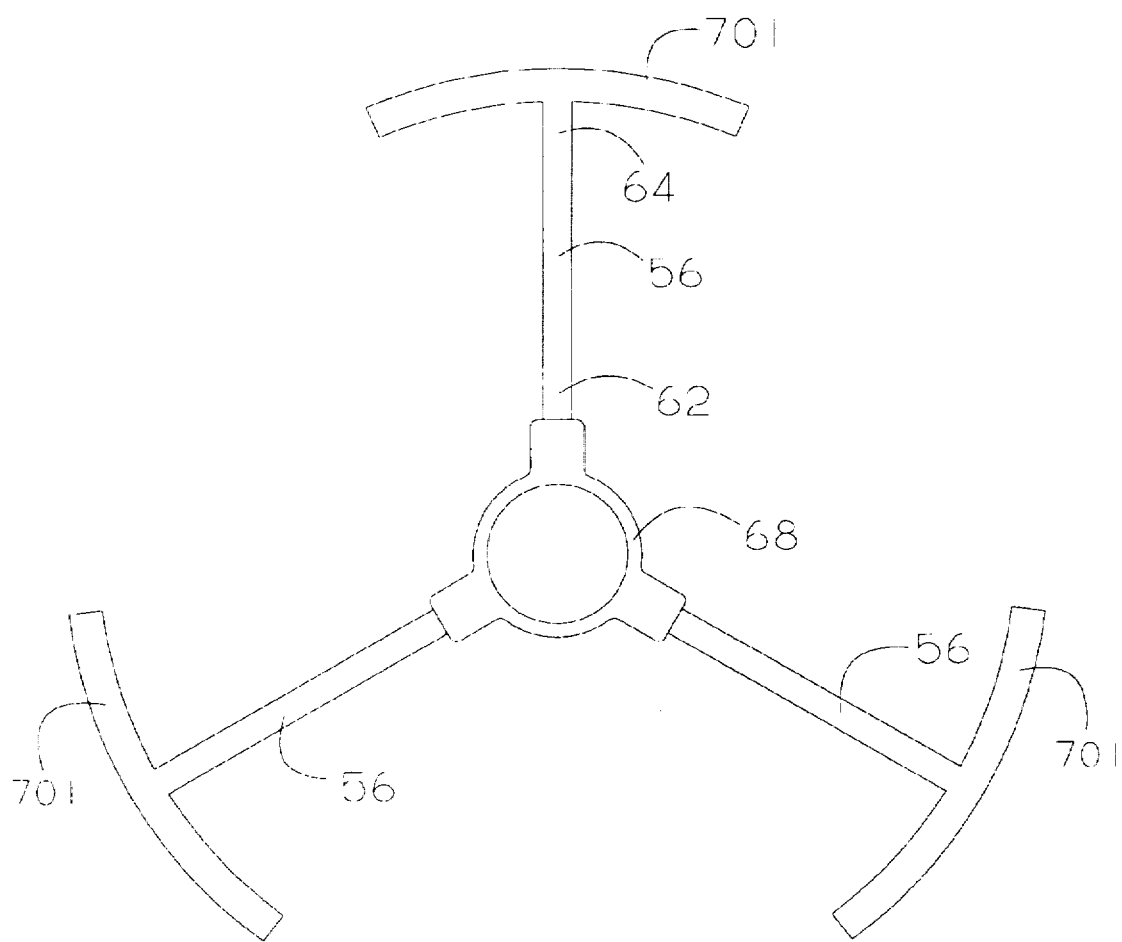
FIG. 7 is a plan view of an alternate embodiment of the inner reinforcement featuring arched peripheral reinforcement members.

FIG. 7 is a plan view of an alternate reinforcing framework for the shaft support that features arched peripheral reinforcement members 701 attached to the interior brace reinforcement 56.

Figure 8:
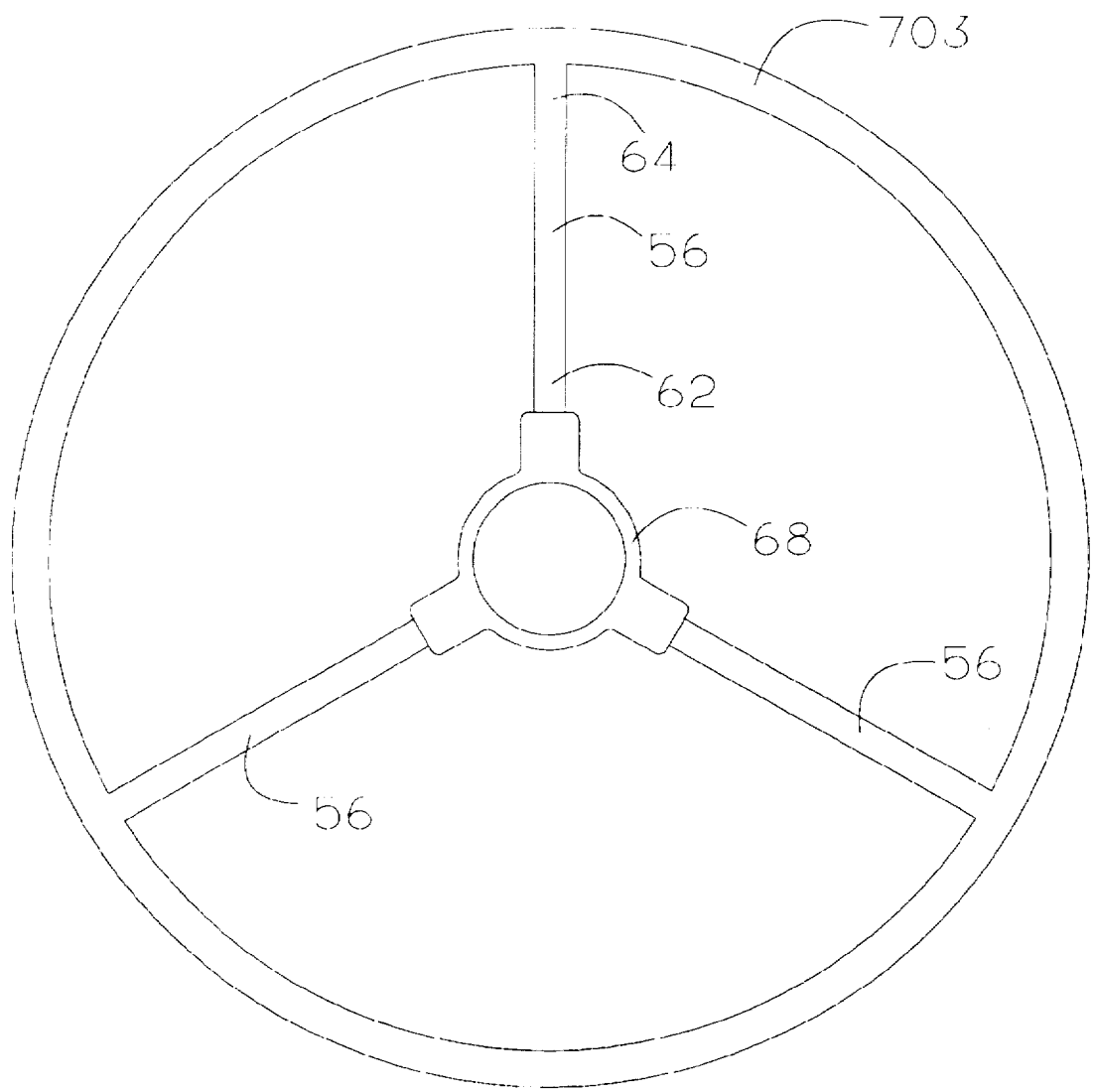
FIG. 8 is a plan view of an alternate inner reinforcement for the shaft support; the inner reinforcement of FIG. 8 has a rim instead of the group of peripheral reinforcement members as shown in FIG. 2G.

FIG. 8 is a plan view of an alternate reinforcing framework for the shaft support; the reinforcing framework of FIG. 8 has a peripheral reinforcement rim 703 instead of a group of the peripheral reinforcement members shown in FIG. 2G.

The foregoing detailed description is provided in sufficient detail to enable one of ordinary skill in the art to make and use the centrifugal pump having a multipartite impeller assembly and a shock-absorbent shaft support. The foregoing detailed description is merely illustrative of several physical embodiments of the centrifugal pump. Physical variations of the centrifugal pump, not fully described in the specification are encompassed within the purview of the claims. Accordingly, the narrow description of the elements in the specification should be used for general guidance rather than to unduly restrict the broader description of the elements in the following claims.

I claim:

1. A magnetic-drive centrifugal pump comprising:

a housing having a housing cavity, an inlet, and an outlet;

a pump shaft located in the housing cavity;

an impeller portion positioned in the housing cavity to receive a fluid from the inlet and to exhaust the fluid from the outlet; the impeller portion having a rear shroud, impeller blades, a tube, and torque receiving means for receiving and transferring torque to the impeller portion; said torque receiving means associated with the rear shroud, the tube extending axially from the rear shroud;

a wet-end magnetic coupler having a substantially hollow core, a magnetic coupling region, and torque transmitting means for transmitting torque from the wet-end magnetic coupler to the impeller portion; said torque receiving means interlocking with and engaging said torque transmitting means;

a radial bearing oriented coaxially with respect to said pump shaft, the pump shaft and the radial bearing being rotatable with respect to one another; the radial bearing located substantially within the hollow core of the wet-end magnetic coupler and coaxially positioned within a tube interior of the tube; and a snap-fit connector for connecting the impeller portion to the magnetic coupler, said snap-fit connector joining the tube to the hollow core of the wet-end magnetic coupler.

2. The centrifugal pump of claim 1 wherein the snap-fit connector comprises a snap-fit joint selected from the group consisting of a discontinuous annular snap-fit joint, a discontinuous polygonal snap-fit joint, a substantially annular snap-fit joint, a cantilever arm snap-fit joint, and a substantially polygonal snap-fit joint.

3. The centrifugal pump of claim 1 wherein said torque transmitting means comprises a polygonal recess in the wet-end magnetic coupler located in an end of the magnetic coupler near the hollow core; and wherein the torque receiving means comprises a polygonal extension protruding axially from the rear shroud, said torque receiving means corresponding in size and shape to said torque transmitting means.

4. The centrifugal of claim 3 wherein said polygonal recess and said polygonal extension have a number of sides corresponding to a quantity of the impeller blades.

5. The centrifugal pump of claim 4 wherein the impeller portion has five of said impeller blades and the polygonal extension and the polygonal recess are pentagonal.

6. The centrifugal pump of claim 1 wherein said torque transmitting means comprises a polygonal extension extending axially from the wet-end magnetic coupler, the polygonal extension containing a portion of the hollow core of the wet-end magnetic coupler; and wherein said torque receiving means comprises a polygonal recess located in the rear shroud, the polygonal extension corresponding in size and shape to the polygonal recess.

7. The centrifugal pump of claim 6 wherein said polygonal recess and said polygonal extension have a number of sides corresponding to a quantity of the impeller blades.

8. The centrifugal pump of claim 1 wherein the snap-fit connector comprises a combination of a substantially annular snap-fit protrusion and a corresponding snap-fit cavity; the snap-fit protrusion engaging the snap-fit cavity, the tube terminating in the snap-fit protrusion, the tube being placed into a hollow region of the hollow core, and the hollow region being a substantially cylindrical volume of the hollow core; and the snap-fit cavity located in the hollow core of the wet-end magnetic coupler.

9. The centrifugal pump of claim 1 wherein the snap-fit connector comprises a combination of a discontinuous annular snap-fit protrusion and a corresponding snap-fit cavity, the tube terminating in the snap-fit protrusion, the snap-fit protrusion engaging the corresponding snap-fit cavity, the snap-fit cavity located in the hollow core of the wet-end magnetic coupler, the tube having axial slots dividing the tube into a group of semi-annular snap-fit arms, the tube being placed into a hollow region of the hollow core, the hollow region being substantially cylindrical.

10. The centrifugal pump of claim 1 wherein the snap-fit connector comprises a snap-fit protrusion and a corresponding snap-fit cavity, the tube having the snap-fit protrusion, the corresponding snap-fit cavity being located in the hollow core of the wet-end magnetic coupler, the snap-fit protrusion engaging the snap-fit cavity, a snap-fit ledge defining a boundary of the snap-fit cavity near a hollow region of the magnetic coupler, and the snap-fit ledge restricting axial movement of the impeller portion with respect to the wet-end magnetic coupler.

11. The centrifugal pump of claim 10 wherein the snap-fit ledge has a radial ledge dimension selected to equal a permissible radial deflection of the snap-fit protrusion.

12. The centrifugal pump of claim 1 wherein the snap-fit connector includes a snap-fit protrusion engaging a corresponding snap-fit cavity; the snap-fit cavity being substantially annular and wherein an outer surface of the radial bearing restricts the radial movement of the snap-fit protrusion located within the snap-fit cavity.

13. The centrifugal pump of claim 1 wherein the snap-fit connector includes a snap-fit protrusion engaging a corresponding substantially cylindrical snap-fit cavity; the snap-fit cavity being located within the hollow core of the magnetic coupler, the snap-fit cavity extending to one end of the magnetic coupler, an outer surface of the radial bearing restricting the radial movement of the snap-fit protrusion located within the snap-fit cavity.

14. The centrifugal pump of claim 1 wherein the snap-fit connector includes:

a snap-fit protrusion extending radially outward from said tube, the snap-fit protrusion having a tapered edge facing the rear shroud; and a snap-fit cavity, a snap-fit ledge defining a portion of the snap-fit cavity, the tapered edge resting near or against the snap-fit ledge when the snap-fit protrusion engages the corresponding snap-fit cavity.

15. The centrifugal pump of claim 1 wherein the snap-fit connector includes a snap-fit protrusion, the snap-fit protrusion having a substantially flat summit, a front slope and a rear slope, the flat summit extending a maximum radial distance or deflection dimension from a tube exterior, the front slope extending radially downward from the flat summit toward the tube exterior of the tube.

16. The centrifugal pump of claim 1 wherein the snap-fit connector includes a snap-fit protrusion extending radially inward from a hollow region within the hollow core of the magnetic coupler, and wherein a corresponding snap-fit recess is located within a tube exterior of the tube, the snap-fit protrusion engaging the snap-fit fit recess.

17. A magnetic-drive centrifugal pump comprising:

a housing having a housing cavity, an inlet, and an outlet;

a pump shaft located in the housing cavity;

an impeller portion positioned to receive a fluid from the inlet and to exhaust the fluid from the outlet, the housing surrounding said impeller portion; the impeller portion having a rear shroud, impeller blades, a tube, and torque receiving means for receiving and transferring torque to the impeller portion, said torque receiving means being associated with the rear shroud, the tube extending axially from the rear shroud;

a wet-end magnetic coupler having a substantially hollow core, a magnetic coupling region, and torque transmitting means for transmitting torque from the wet-end magnetic coupler to the impeller portion; said torque receiving means interlocking with and engaging said torque transmitting means;

a radial bearing coaxially oriented with respect to said pump shaft, the pump shaft and the radial bearing being rotatable with respect to one another; the radial bearing located substantially within the hollow core of the wet-end magnetic coupler and coaxially positioned within a tube interior of the tube; and a snap-fit connector for connecting the impeller portion to the magnetic coupler, said snap-fit connector located near an outer surface of the radial bearing;

a shaft support for supporting the pump shaft, the shaft support having a hub, braces, and a peripheral base; the braces extending radially outward from the hub toward the peripheral base; the braces having interior brace reinforcements, the interior brace reinforcements being encapsulated by a corrosion-resistant exterior layer, each interior brace reinforcement connected to a peripheral reinforcement member that is secured to the peripheral base.

18. The centrifugal pump according to claim 17 wherein any peripheral reinforcement member or members are substantially rectilinear and orthogonally intersect with the corresponding interior brace reinforcements.

19. The centrifugal pump according to claim 17 wherein any peripheral reinforcement member or members are substantially arched and intersect the interior brace reinforcements.

20. The centrifugal pump according to claim 17 wherein the peripheral reinforcement member is substantially circular and intersects the interior brace reinforcements.

21. The centrifuigal pump according to claim 17 wherein the peripheral base further comprises a substantially annular base having a front side and a rear side, the rear side having an annular recess for a ceramic ring of an axial bearing.

22. The centrifugal pump according to claim 17 wherein the shaft support is located between an impeller intake and the inlet, the braces having a frontal surface area and a lateral surface area, the frontal surface area facing a fluid flow from the inlet, the lateral surface area exceeding the frontal surface area.

23. The centrifugal pump according to claim 22 wherein the hub has a streamlined nose facing the inlet.

24. The centrifugal pump according to claim 17 wherein the braces have an inner portion located adjacent to the hub and an outer portion located adjacent to the peripheral base; each brace being tilted with respect to a shaft axis of the pump shaft such that each brace approximately makes an eighty degree angle or rake with the shaft axis and wherein the outer portion of each brace is tilted forward toward a pump front while the inner portion is tilted backwards toward a pump rear.

25. The centrifugal pump according to claim 17 wherein the peripheral base is constructed from a group consisting of a plastic, a plastic composite, a fiber-reinforced plastic, a polymer, a polymer composite, and a fiber-reinforced polymer.

26. The centrifugal pump according to claim 17 wherein each brace has a cross section, the cross section having a greater axial dimension than a frontal surface dimension, a portion of the axial dimension being perpendicular to a portion of the frontal surface dimension.

27. The centrifugal pump according to claim 17 wherein the interior brace reinforcements and the peripheral reinforcement member are constructed from a metal.

28. The centrifugal pump according to claim 17 further comprising a cylindrical hub reinforcement; and wherein the cylindrical hub reinforcement, the interior brace reinforcements, and the peripheral reinforcement member form a continuous reinforcing spider constructed from a nickel alloy.

29. The centrifugal pump according to claim 17 wherein the peripheral reinforcement is partially or completely encapsulated with a corrosion-resistant material, said encapsulation of the peripheral reinforcement securing the peripheral reinforcement to the peripheral base.

30. The centrifugal pump according to claim 29 wherein the corrosion-resistant material is selected from the group consisting of a plastic, a polymer, a fiber-reinforced plastic, a fiber-reinforced polymer, a composite plastic, a composite polymer, an elastomer; and wherein the peripheral base is made from said corrosion-resistant material.

31. The centrifugal pump of claim 17 wherein the snap-fit connector comprises a snap-fit joint selected from the group consisting of a discontinuous annular snap-fit joint, a substantially annular snap-fit joint, a discontinuous polygonal snap-fit joint, a cantilever arm snap-fit joint, and a continuous polygonal snap-fit joint.

32. The centrifugal pump of claim 17 wherein said torque transmitting means comprises a polygonal recess in the wet-end magnetic coupler, said torque transmitting means located in an end of the magnetic coupler; and wherein the torque receiving means comprises a polygonal extension protruding axially from the rear shroud, said torque receiving means corresponding in size and shape to the said torque transmitting means.

33. The centrifugal of claim 32 wherein said polygonal recess and said polygonal extension have a number of sides corresponding or approximately equal to a quantity of the impeller blades.

34. The centrifugal pump of claim 17 wherein said torque transmitting means comprises a polygonal extension extending axially from the wet-end magnetic coupler, the polygonal extension containing a portion of the hollow core of the wet-end magnetic coupler; and wherein said torque receiving means comprises a polygonal recess located in the rear shroud, the polygonal extension corresponding in size and shape to the polygonal recess.

35. The centrifugal pump of claim 17 wherein said torque transmitting means comprises a polygonal recess and said torque receiving means comprises a polygonal protrusion having a number of sides corresponding to or approximately equal to a quantity of the impeller blades.

36. The centrifugal pump of claim 17 wherein the snap-fit connector comprises a substantially annular snap-fit protrusion and a snap-fit cavity; the tube terminating in the snap-fit protrusion, the snap-fit cavity located in the hollow core of the wet-end magnetic coupler; the tube being placed into a hollow region of the hollow core, the hollow region being a substantially cylindrical volume of the hollow core, and an outer surface of the radial bearing being placed adjacent to the tube interior.

37. The centrifugal pump of claim 17 wherein the snap-fit connector comprises a discontinuous annular snap-fit protrusion and a snap-fit cavity; the tube terminating in the snap-fit protrusion, the snap-fit cavity located in the hollow core of the magnetic coupler, the tube having axial slots dividing the tube into a group of semi-annular snap-fit arms, the tube being placed into a hollow region of the hollow core, the hollow region being substantially cylindrical, and an outer surface of the radial bearing being adjacent to the tube interior of the tube.

38. The centrifugal pump of claim 17 wherein the snap-fit connector includes a snap-fit protrusion and a snap-fit cavity; the tube having a snap-fit protrusion extending radially from the tube, the corresponding snap-fit cavity being located in the hollow core of the wet-end magnetic coupler the snap-fit protrusion engaging the snap-fit cavity, a snap-fit ledge defining a boundary of the snap-fit cavity near a hollow region of the magnetic coupler, and the snap-fit ledge restricting axial movement of the impeller portion with respect to the magnetic coupler.

39. The centrifugal pump of claim 17 wherein the snap-fit connector includes a snap-fit protrusion that engages a substantially cylindrical snap-fit cavity, the snap-fit cavity extending to one end of the magnetic coupler, the radial bearing disposed coaxially within the tube interior and restricting the radial movement of the snap-fit protrusion.

40. The centrifugal pump of claim 17 wherein the snap-fit connector includes:

a snap-fit protrusion extending radially outward from said tube, the snap-fit protrusion having a tapered edge facing the rear shroud; and a snap-fit cavity, a snap-fit ledge defining a portion of the snap-fit cavity, the tapered edge resting near or against a snap-fit ledge when the snap-fit protrusion engages the corresponding snap-fit cavity.

41. The centrifugal pump according to claim 17 further comprising an axial bearing coaxially oriented with respect to said pump shaft, the axial bearing retained within a support recess of the shaft support and within at least one impeller recess in said impeller portion.

42. A magnetic-drive centrifugal pump comprising:

a housing having a housing cavity, an inlet, and an outlet;

a first shaft support located in the housing cavity, the first shaft support supporting a pump shaft;

an impeller portion positioned in the housing cavity, the impeller portion having a rear shroud, impeller blades, and torque receiving means for receiving and transferring torque to the impeller portion, said torque receiving means being coextensive with or associated with the rear shroud;

a wet-end magnetic coupler having a first magnetic coupling region, a hollow core, and torque transmitting means for transmitting torque from the wet-end magnetic coupler to the impeller portion; said torque receiving means interlocking with and engaging said torque transmitting means;

a dry-end magnetic coupler having a second magnetic coupling region, the first magnetic coupling region oriented in proximity to the second magnetic coupling region to permit magnetic or electromagnetic coupling between the dry-end magnetic coupler and the wet-end magnetic coupler;

a containment shell intervening between the wet-end magnetic coupler and the dry-end magnetic coupler; the containment shell secured to the housing;

a radial bearing coaxially positioned with respect to said pump shaft, the pump shaft and the radial bearing being rotatable with respect to one another; the radial bearing located partially or completely within the hollow core of the wet-end magnetic coupler; and a snap-fit connector for connecting the impeller portion to the magnetic coupler, said snap-fit connector joining the impeller portion to the wet-end magnetic coupler.

43. The centrifugal pump according to claim 42 wherein the first shaft support further comprises:

a hub;

at least one brace extending radially outward from the hub toward a base;

a peripheral reinforcement member;

an interior brace reinforcement associated with any of said brace or braces, the interior brace reinforcement being encapsulated by a corrosion-resistant exterior layer, the interior brace reinforcement connected to the peripheral reinforcement member, an encapsulation junction securing the peripheral reinforcement member to the base.

44. The centrifugal pump according to claim 43 wherein the encapsulation junction is a volume of corrosion-resistant material partially or completely surrounding the peripheral reinforcement member, the corrosion-resistant material being selected from the group consisting of plastics, fluoroplastics, polymers, fiber-reinforced plastics, and fiber-reinforced polymers, plastic composites, polymer composites, and elastomers.

45. The centrifugal pump according to claim 42 further comprising a second shaft support located coextensively in a rear of the containment shell, and wherein the pump shaft is stationarily retained by a shaft recess in the second shaft support that interlocks with a corresponding end of the pump shaft.

46. The centrifugal pump according to claim 42 wherein the first shaft support has a socket and wherein the pump shaft has a plug-end, the plug-end being inserted into the socket, a size and a shape of socket corresponding to a size and a shape of the plug end.

47. The centrifugal pump according to claim 42 wherein the wet-end magnetic coupler further comprises:

a sleeve reinforcement; and a plurality of magnets secured to the sleeve reinforcement, the plurality of magnets arranged to form the first magnetic coupling region, the sleeve reinforcement and the magnets encapsulated by a corrosion-resistant material.

48. The centrifugal pump according to claim 17 wherein the peripheral reinforcement is a member of a group of peripheral reinforcement members, the interior brace reinforcements connected to the group; the group secured to the peripheral base via encapsulations of a corrosion-resistant material.

49. The centrifugal pump according to claim 17 wherein the peripheral base further comprises a substantially annular base having a front side and a rear side, the rear side having an annular recess for an axial bearing.

* * * * *